US010057295B2

(12) United States Patent
Touboul

(10) Patent No.: US 10,057,295 B2
(45) Date of Patent: *Aug. 21, 2018

(54) SYSTEM AND METHOD FOR PROVIDING NETWORK AND COMPUTER FIREWALL PROTECTION WITH DYNAMIC ADDRESS ISOLATION TO A DEVICE

(71) Applicant: CUPP Computing AS, Oslo (NO)

(72) Inventor: Shlomo Touboul, Kefar Haim (IL)

(73) Assignee: CUPP Computing AS, Oslo (NO)

( * ) Notice: Subject to any disclaimer, the term of this patent is extended or adjusted under 35 U.S.C. 154(b) by 0 days.

This patent is subject to a terminal disclaimer.

(21) Appl. No.: 15/653,376

(22) Filed: Jul. 18, 2017

(65) Prior Publication Data
US 2018/0152479 A1 May 31, 2018

Related U.S. Application Data

(63) Continuation of application No. 15/201,309, filed on Jul. 1, 2016, now Pat. No. 9,756,079, which is a
(Continued)

(51) Int. Cl.
*G06F 9/00* (2006.01)
*H04L 29/06* (2006.01)

(52) U.S. Cl.
CPC .......... *H04L 63/20* (2013.01); *H04L 63/0245* (2013.01)

(58) Field of Classification Search
CPC . H04L 63/0236; H04L 29/1233; H04L 61/25; H04L 63/02
(Continued)

(56) References Cited

U.S. PATENT DOCUMENTS

| H1944 H | 2/2001 | Cheswick |
| 6,286,087 B1 | 9/2001 | Ito |

(Continued)

FOREIGN PATENT DOCUMENTS

| WO | 2000078008 | 12/2000 |
| WO | 2004030308 | 4/2004 |
| WO | 2007110094 | 10/2007 |

OTHER PUBLICATIONS

Breeden II, John et al., "A Hardware Firewall You Take With You," Government Computer News, located at http:/gcn.com/Articles/2005/06/01/A-hardware-firewall-you-take-with-you.aspx?p=1, Jun. 1, 2005.

(Continued)

*Primary Examiner* — Teshome Hailu
(74) *Attorney, Agent, or Firm* — Sheppard, Mullin, Richter & Hampton LLP

(57) ABSTRACT

A computer performs dynamic address isolation. The computer comprises an application associated with an application address, a network interface coupled to receive incoming data packets from and transmit outgoing data packets to an external network, a network address translation engine configured to translate between the application address and a public address, and a driver for automatically forwarding the outgoing data packets to the network address translation engine to translate the application address to the public address, and for automatically forwarding the incoming data packets to the network address translation engine to translate the public address to the application address. The computer may communicate with a firewall configured to handle both network-level security and application-level security.

18 Claims, 25 Drawing Sheets

Related U.S. Application Data continuation of application No. 13/745,591, filed on Jan. 18, 2013, now Pat. No. 9,391,956, which is a continuation of application No. 12/130,914, filed on May 30, 2008, now Pat. No. 8,365,272.

(60) Provisional application No. 60/940,882, filed on May 30, 2007.

(58) Field of Classification Search
USPC .......................................................... 726/13
See application file for complete search history.

(56) References Cited

U.S. PATENT DOCUMENTS

| | | | |
|---|---|---|---|
| 6,466,779 B1 | 10/2002 | Moles | |
| 6,772,345 B1 | 8/2004 | Shetty | |
| 6,813,682 B2 | 11/2004 | Bress | |
| 7,036,143 B1 | 4/2006 | Leung | |
| 7,065,644 B2 | 6/2006 | Daniell | |
| 7,069,330 B1 | 6/2006 | McArdle | |
| 7,076,690 B1 | 7/2006 | Todd | |
| 7,086,089 B2 | 8/2006 | Hrastar | |
| 7,131,141 B1 | 10/2006 | Blewett | |
| 7,184,554 B2 | 2/2007 | Freese | |
| 7,197,638 B1 | 3/2007 | Grawrock | |
| 7,283,542 B2* | 10/2007 | Mitchell | H04L 29/06 370/352 |
| 7,353,533 B2 | 4/2008 | Wright | |
| 7,359,983 B1* | 4/2008 | Maufer | H04L 29/12377 709/217 |
| 7,360,242 B2 | 4/2008 | Syvanne | |
| 7,418,253 B2 | 8/2008 | Kavanagh | |
| 7,539,828 B2 | 5/2009 | Lomnes | |
| 7,657,941 B1 | 2/2010 | Zaitsev | |
| 7,908,476 B2 | 3/2011 | Kandasamy | |
| 7,984,479 B2 | 7/2011 | Brabson | |
| 7,992,199 B1* | 8/2011 | Winick | H04L 63/0209 709/225 |
| 8,180,654 B2 | 5/2012 | Berkman | |
| 8,218,449 B2 | 7/2012 | Taylor | |
| 8,218,558 B2 | 7/2012 | Tan | |
| 8,234,261 B2 | 7/2012 | Monahan | |
| 8,239,531 B1 | 8/2012 | Bellovin | |
| 8,266,670 B1 | 9/2012 | Merkow | |
| 8,321,934 B1 | 11/2012 | Cooley | |
| 8,402,528 B1 | 3/2013 | McCorkendale | |
| 2002/0111824 A1 | 8/2002 | Grainger | |
| 2003/0046397 A1 | 3/2003 | Trace | |
| 2003/0055994 A1 | 3/2003 | Herrmann | |
| 2003/0070084 A1* | 4/2003 | Satomaa | H04L 41/00 726/11 |
| 2003/0097431 A1 | 5/2003 | Dill | |
| 2003/0110391 A1 | 6/2003 | Wolff | |
| 2003/0126468 A1 | 7/2003 | Markham | |
| 2003/0131245 A1 | 7/2003 | Linderman | |
| 2003/0142683 A1 | 7/2003 | Lam | |
| 2003/0224758 A1 | 12/2003 | O'Neill | |
| 2004/0003262 A1 | 1/2004 | England | |
| 2004/0064575 A1 | 4/2004 | Rasheed | |
| 2004/0085944 A1 | 5/2004 | Boehm | |
| 2004/0093520 A1 | 5/2004 | Lee | |
| 2004/0123153 A1 | 6/2004 | Wright | |
| 2004/0177274 A1 | 9/2004 | Aroya | |
| 2004/0203296 A1 | 10/2004 | Moreton | |
| 2004/0210775 A1* | 10/2004 | Gbadegesin | H04L 29/06 726/13 |
| 2004/0237079 A1 | 11/2004 | Cox | |
| 2005/0091522 A1 | 4/2005 | Hearn | |
| 2005/0109841 A1 | 5/2005 | Ryan | |
| 2005/0114711 A1* | 5/2005 | Hesselink | H04L 63/0209 726/4 |
| 2005/0149757 A1 | 7/2005 | Corbett | |
| 2005/0208967 A1 | 9/2005 | Buniatyan | |
| 2005/0254455 A1 | 11/2005 | Plehn | |
| 2005/0278544 A1 | 12/2005 | Baxter | |
| 2006/0022802 A1 | 2/2006 | Bridgelall | |
| 2006/0031940 A1 | 2/2006 | Rozman | |
| 2006/0037071 A1* | 2/2006 | Rao | H04L 12/2856 726/13 |
| 2006/0056317 A1 | 3/2006 | Manning | |
| 2006/0059092 A1 | 3/2006 | Burshan | |
| 2006/0064391 A1 | 3/2006 | Petrov | |
| 2006/0074896 A1 | 4/2006 | Thomas | |
| 2006/0075494 A1 | 4/2006 | Bertman | |
| 2006/0075501 A1 | 4/2006 | Thomas | |
| 2006/0085528 A1 | 4/2006 | Thomas | |
| 2006/0161985 A1 | 7/2006 | Zhao | |
| 2006/0174342 A1 | 8/2006 | Zaheer | |
| 2006/0224794 A1 | 10/2006 | Stevens | |
| 2006/0242686 A1 | 10/2006 | Toda | |
| 2006/0277405 A1 | 12/2006 | Bowler | |
| 2007/0005987 A1 | 1/2007 | Durham | |
| 2007/0022474 A1 | 1/2007 | Rowett | |
| 2007/0061887 A1 | 3/2007 | Hoover | |
| 2007/0083939 A1 | 4/2007 | Fruhauf | |
| 2007/0097976 A1 | 5/2007 | Wood | |
| 2007/0104197 A1 | 5/2007 | King | |
| 2007/0118874 A1 | 5/2007 | Adams | |
| 2007/0118893 A1 | 5/2007 | Crawford | |
| 2007/0123214 A1 | 5/2007 | Mock | |
| 2007/0130433 A1 | 6/2007 | Safa | |
| 2007/0130457 A1 | 6/2007 | Kamat | |
| 2007/0143827 A1 | 6/2007 | Nicodemus | |
| 2007/0143851 A1 | 6/2007 | Nicodemus | |
| 2007/0192500 A1 | 8/2007 | Lum | |
| 2007/0192854 A1 | 8/2007 | Kelley | |
| 2007/0199061 A1 | 8/2007 | Byres | |
| 2007/0214369 A1 | 9/2007 | Roberts | |
| 2007/0240217 A1 | 10/2007 | Tuvell | |
| 2007/0261112 A1 | 11/2007 | Todd | |
| 2007/0281664 A1 | 12/2007 | Kaneko | |
| 2007/0294744 A1 | 12/2007 | Alessio | |
| 2008/0034419 A1 | 2/2008 | Mullick | |
| 2008/0066148 A1 | 3/2008 | Lim | |
| 2008/0083037 A1 | 4/2008 | Kruse | |
| 2008/0098478 A1 | 4/2008 | Vaidya | |
| 2008/0109871 A1 | 5/2008 | Jacobs | |
| 2008/0114990 A1 | 5/2008 | Hilbert | |
| 2008/0134163 A1 | 6/2008 | Golde | |
| 2008/0141349 A1 | 6/2008 | Lyle | |
| 2008/0235755 A1* | 9/2008 | Blaisdell | H04L 63/0227 726/1 |
| 2008/0282337 A1 | 11/2008 | Crawford | |
| 2008/0307240 A1 | 12/2008 | Dahan | |
| 2009/0019223 A1 | 1/2009 | Lection | |
| 2009/0106556 A1 | 4/2009 | Hamid | |
| 2009/0165132 A1 | 6/2009 | Jain | |
| 2009/0249465 A1 | 10/2009 | Touboul | |
| 2009/0253454 A1 | 10/2009 | Sampson | |
| 2009/0254993 A1 | 10/2009 | Leone | |
| 2010/0064341 A1 | 3/2010 | Aldera | |
| 2010/0186093 A1 | 7/2010 | Aussel | |
| 2010/0195833 A1 | 8/2010 | Priestley | |
| 2010/0242109 A1 | 9/2010 | Lee | |
| 2010/0251369 A1 | 9/2010 | Grant | |
| 2010/0333088 A1 | 12/2010 | Rogel | |
| 2011/0023118 A1 | 1/2011 | Wright | |
| 2011/0154443 A1 | 6/2011 | Thakur | |
| 2011/0154477 A1 | 6/2011 | Parla | |
| 2011/0182180 A1 | 7/2011 | Riddle | |
| 2011/0264931 A1 | 10/2011 | Chang | |
| 2011/0268106 A1 | 11/2011 | Dalton, Jr. | |
| 2012/0005756 A1 | 1/2012 | Hoefelmeyer | |
| 2012/0054744 A1 | 3/2012 | Singh | |
| 2012/0084831 A1 | 4/2012 | Hu | |
| 2012/0110320 A1 | 5/2012 | Kumar | |
| 2012/0149350 A1 | 6/2012 | Fan | |
| 2012/0173609 A1 | 7/2012 | Kulaga | |
| 2012/0185846 A1 | 7/2012 | Recio | |
| 2012/0216273 A1 | 8/2012 | Rolette | |
| 2012/0233695 A1 | 9/2012 | Mahaffey | |
| 2012/0239739 A1 | 9/2012 | Manglik | |
| 2012/0240183 A1 | 9/2012 | Sinha | |

(56) References Cited

U.S. PATENT DOCUMENTS

| | | |
|---|---|---|
| 2012/0240236 A1 | 9/2012 | Wyatt |
| 2013/0031601 A1 | 1/2013 | Bott |
| 2013/0074144 A1 | 3/2013 | Narayanaswamy |
| 2013/0091534 A1 | 4/2013 | Gilde |
| 2013/0097659 A1 | 4/2013 | Das |
| 2013/0097660 A1 | 4/2013 | Das |
| 2014/0032314 A1 | 1/2014 | Gieseke |

OTHER PUBLICATIONS

Claessens, Joris et al., "(How) Can Mobile Agents Do Secure Electronic Transactions on Mobile Hosts? A Survey of the Security Issues and the Current Solutions," ACM Transactions on Internet Technology, vol. 3, No. 1, pp. 28-48, Feb. 2003.

CyberGuard Corporation, "Model 1: Wireless Mobile Security Appliance," located at http://support2.cyberguard.com/products/oem/model1.htm, 2005.

Entry, Inc., "CyberGuard Develops a Custom Mobile Security Appliance," SecurityProNews, located at http://www.securitypronews.com/news/securitynews/spn-45-20041007CyberGuardDevelo . . . , Oct. 7, 2004.

Kent, S. et al., "Security Architecture for the Internet Protocol," I.E.T.F. Network Working Group, RFC 4301, pp. 10-11, Dec. 2005.

PMC-Sierra, Inc., "MSP8120 Multi-Service Security Processor," Product Brief, 2007.

Prevelakis, Vassilis et al., "Drop-In Security for Distributed and Portable Computing Elements," Internet Research: Electronic Networking, Applications and Policy, vol. 13, No. 2, pp. 107-115, located at http://www.cs.columbia.edu/~angelos/Papers/InternetResearch-Final.pdf, 2003.

WatchGuard Technologies, Inc., "Mobile User VPN and PPTP," Internet Security Handbook, copyright 1998-2001, pp. 1-2, located at http://www.watchguard.com/help/lss/41 /handbook/vpn3.htm, believe published Jun. 5, 2003.

ZyXEL Communications Corp., "ZyXEL Releases Worlds First Palm-Sized Portable Personal Firewall for Ultimate Security: ZyWALL P1 Pushes Network Security to the End-Point PC's with Minimum Administration Effort," ZyXEL News, located at http://global.zyxel.com/news/press.php?indexflag=20050310013432, Mar. 8, 2005.

European Patent Application No. 06821641.5, Examination Report dated Dec. 16, 2016.

European Patent Application No. 06821641.5, Search Report dated May 17, 2011.

European Patent Application No. 08847968.8, Search Report dated Oct. 25, 2011.

European Patent Application No. 13845746.0, Search Report dated Jun. 7, 2016.

International Application No. PCT/IL2006/001428, International Search Report and Written Opinion dated Jul. 15, 2008.

International Application No. PCT/IL2008/000740, International Search Report and Written Opinion dated Nov. 5, 2008.

International Application No. PCT/US2008/055942, International Search Report and Written Opinion dated Apr. 6, 2009.

International Application No. PCT/US2009/065204, International Search Report and Written Opinion dated Jan. 13, 2010.

International Application No. PCT/US2013/064161, International Search Report and Written Opinion dated Apr. 18, 2014.

International Application No. PCT/US2014/045826, International Search Report and Written Opinion dated Oct. 30, 2014.

International Application No. PCT/US2015/015970, International Search Report and Written Opinion dated May 28, 2015.

\* cited by examiner (DYNAMIC ADDRESS ISOLATION)

(HYBRID FIREWALL)

(HYBRID FIREWALL EXAMPLE)

SYSTEM AND METHOD FOR PROVIDING NETWORK AND COMPUTER FIREWALL PROTECTION WITH DYNAMIC ADDRESS ISOLATION TO A DEVICE

CROSS-REFERENCE TO RELATED APPLICATIONS

This application is a continuation of U.S. patent application Ser. No. 15/201,309, filed Jul. 1, 2016 and entitled "System and Method for Providing Network and Computer Firewall Protection with Dynamic Address Isolation to a Device," which is a continuation of U.S. patent application Ser. No. 13/745,591, filed Jan. 18, 2013 and entitled "System and Method for Providing Network and Computer Firewall Protection with Dynamic Address Isolation to a Device," now U.S. Pat. No. 9,391,956, which is a continuation of U.S. patent application Ser. No. 12/130,914, filed May 30, 2008 and entitled "System and Method for Providing Network and Computer Firewall Protection with Dynamic Address Isolation to a Device," now U.S. Pat. No. 8,365,272, which claims priority to U.S. Provisional Patent Application Ser. No. 60/940,882, filed May 30, 2007 and entitled "Systems and Methods for Network Address Isolation and Separation Using Personal Firewall," which are incorporated herein by reference.

TECHNICAL FIELD

This invention relates generally to computer security, and more particularly provides a system and method for providing data and device security between external and host devices.

BACKGROUND

The internet is an interconnection of millions of individual computer networks owned by governments, universities, nonprofit groups, companies and individuals. While the internet is a great source of valuable information and entertainment, the internet has also become a major source of system damaging and system fatal application code, such as "viruses," "spyware," "adware," "worms," "Trojan horses," and other malicious code.

To protect users, programmers design computer and computer-network security systems for blocking malicious code from attacking both individual and network computers. On the most part, network security systems have been relatively successful. A computer that connects to the internet from within an enterprise's network typically has two lines of defense. The first line of defense includes a network security system, which may be part of the network gateway, that includes firewalls, antivirus, antispyware and content filtering. The second line of defense includes individual security software on individual machines, which is not typically as secure as the network security system and is thus more vulnerable to attacks. In combination, the first and second lines of defense together provide pretty good security protection. However, when a device connects to the internet without the intervening network security system, the device loses its first line of defense. Thus, mobile devices (e.g., laptops, desktops, PDAs such as RIM's Blackberry, cell phones, any wireless device that connects to the internet, etc.) when traveling outside the enterprise network are more vulnerable to attacks.

FIG. 1 illustrates an example network system 100 of the prior art. Network system 100 includes a desktop 105 and a mobile device 110, each coupled to an enterprise's intranet 115. The intranet 115 is coupled via a network security system 120 (which may be a part of the enterprise's gateway) to the untrusted internet 130. Accordingly, the desktop 105 and mobile device 110 access the internet 130 via the network security system 120. A security administrator 125 typically manages the network security system 120 to assure that it includes the most current security protection and thus that the desktop 105 and mobile device 110 are protected from malicious code. Demarcation 135 divides the trusted enterprise 140 and the untrusted public internet 130. Because the desktop 105 and the mobile device 110 are connected to the internet 130 via the network security system 120, both have two lines of defense (namely, the network security system 120 and the security software resident on the device itself) against malicious code from the internet 130. Of course, although trusted, the intranet 115 can also be a source of malicious code.

FIG. 2 illustrates an example network system 200 of the prior art, when the mobile device 110 has traveled outside the trusted enterprise 140 and reconnected to the untrusted internet 130. This could occur perhaps when the user takes mobile device 110 on travel and connects to the internet 130 at a cybercafe, at a hotel, or via any untrusted wired or wireless connection. Accordingly, as shown, the mobile device 110 is no longer protected by the first line of defense (by the network security system 120) and thus has increased its risk of receiving malicious code. Further, by physically bringing the mobile device 110 back into the trusted enterprise 140 and reconnecting from within, the mobile device 110 risks transferring any malicious code received to the intranet 115.

As the number of mobile devices and the number of attacks grow, mobile security is becoming increasingly important. The problem was emphasized in the recent Info-Security Conference in New York on Dec. 7-8, 2005. However, no complete solutions were presented.

Similarly, when a host device is connected to an external device such as a USB flash drive, iPod, external hard drive, etc., both devices are vulnerable to receipt of malicious code or transfer of private data. FIG. 11 illustrates an example prior art data exchange system 1100 that includes a host computer (host) 1105 and an external device 1110. The host 1105 includes an external device (ED) port 1115, such as a USB port, for receiving the external device 1110. The host 1105 also includes ED drivers 1120 for performing enumeration and enabling communications between the external device 1110 and the host 1105. The external device 1110 includes an ED plug, such as a USB plug, for communicating with the ED port 115. Both of the host 1105 and external device 1110 are vulnerable to receipt of malicious code or transfer of private data.

Accordingly, there is a need for a system and method of providing security to host and external devices.

SUMMARY

In one embodiment, the present invention provides a computer comprising an application associated with an application address; a network interface coupled to receive incoming data packets from and transmit outgoing data packets to an external network; a network address translation engine configured to translate between the application address and a public address; and a driver for automatically forwarding the outgoing data packets to the network address translation engine to translate the application address to the public address, and for automatically forwarding the incoming data packets to the network address translation engine to translate the public address to the application address. The network address translation engine may be part of the driver or part of a firewall. The firewall may be located on a mobile security system. The network address translation engine may be configured to use Dynamic Host Configuration Protocol. The computer may be configured to send data packets identifying the application to a firewall, and the firewall may be configured to handle both network-level security and application-level security.

In one embodiment, the present invention provides a system comprising a network interface; a firewall in communication with the network interface configured to handle both network-level security and application-level security; and a computer in communication with the firewall, having one or more applications, and being configured to send data packets identifying the one or more applications to the firewall. Each data may be is associated with one of the one or more applications. Each data packet may comprise data identifying the application associated with the data packet. The firewall may be configured to use the data identifying the application associated with the data packet to handle application-level security, to create a data packet subset by removing the data identifying the application from the data packet, and to send the data packet subset to an external network. The network interface may be configured to receive incoming data from an external network, and to route the incoming data to the firewall. Each application may be associated with at least one address. The firewall may be configured to dynamically isolate the address from an external network. The firewall may be configured to dynamically isolate the address from the external network through the use of Dynamic Host Configuration Protocol.

In one embodiment, the present invention provides a method within a personal computer of processing incoming data associated with a public address, the method comprising receiving the data from an external network; translating the public address into an internal address associated with an application; analyzing the data for malicious code; and routing the data to the application if the data does not comprise malicious code. The analyzing step may comprise analyzing the data for malicious code at both the network level and the application level. The translating step may use Dynamic Host Configuration Protocol.

In one embodiment, the present invention provides a method within a computer of processing outgoing data, the method comprising receiving outgoing data from an application, the application being associated with an internal address; translating the internal address into a public address; and routing at least a subset of the outgoing data to an external network using the public address, thereby dynamically isolating the internal address from the external network. The translating step may use Dynamic Host Configuration Protocol. The method may further comprise configuring the outgoing data into one or more data packets; associating each of the one or more data packets with the application; and embedding application-identifying data in each of the one or more data packets. The method may further comprise creating one or more data packet subsets by removing the application-identifying data from each of the one or more data packets, wherein the routing step comprises routing the one or more data packet subsets to the external network.

DETAILED DESCRIPTION

The following description is provided to enable any person skilled in the art to make and use the invention, and is provided in the context of a particular application and its requirements. Various modifications to the embodiments may be possible to those skilled in the art, and the generic principles defined herein may be applied to these and other embodiments and applications without departing from the spirit and scope of the invention. Thus, the present invention is not intended to be limited to the embodiments shown, but is to be accorded the widest scope consistent with the principles, features and teachings disclosed herein.

An embodiment of the present invention uses a small piece of hardware that connects to a mobile device and filters out attacks and malicious code. The piece of hardware may be referred to as a "mobile security system" or "personal security appliance." Using the mobile security system, a mobile device can be protected by greater security and possibly by the same level of security offered by its associated corporation/enterprise.

Figure 1:
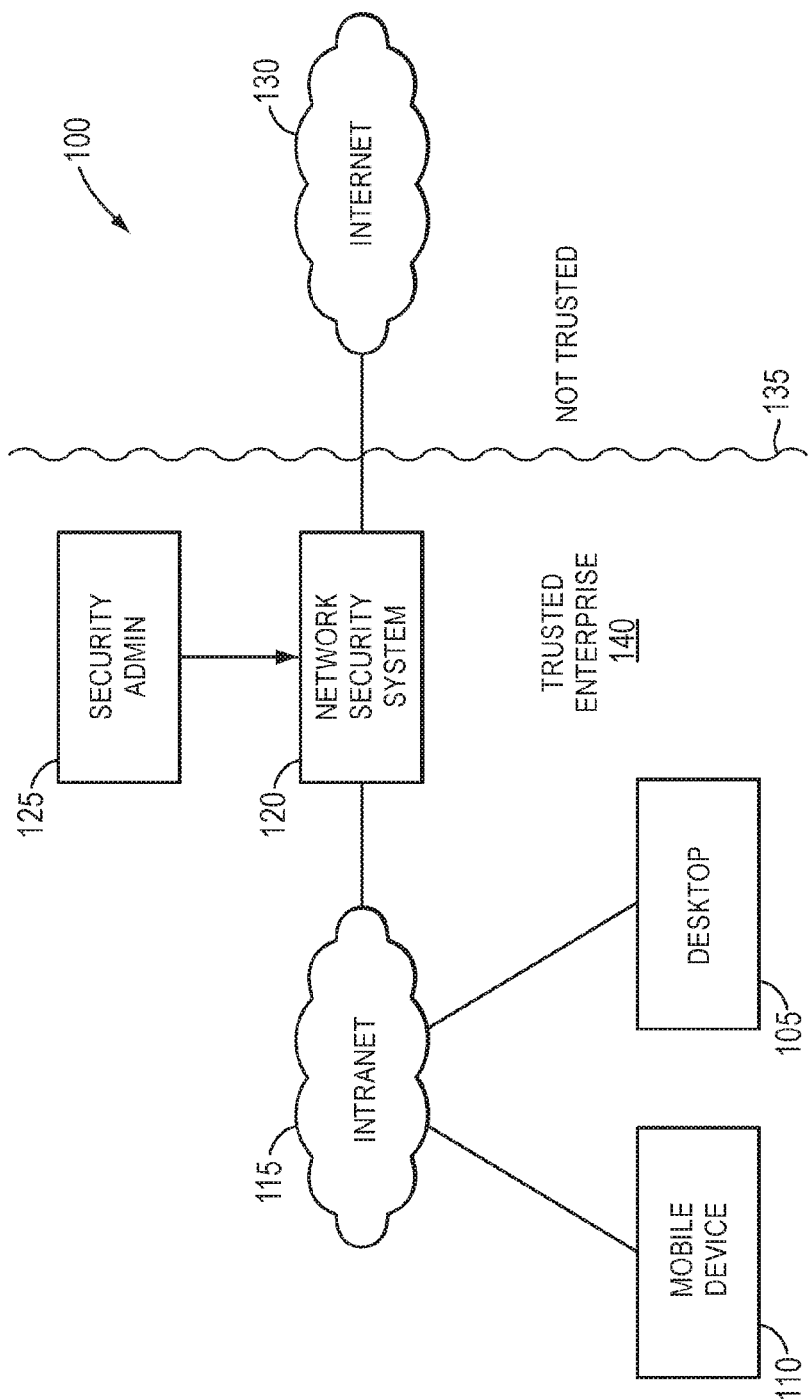
FIG. 1 is a block diagram of a prior art network system in a first state.
Figure 2:
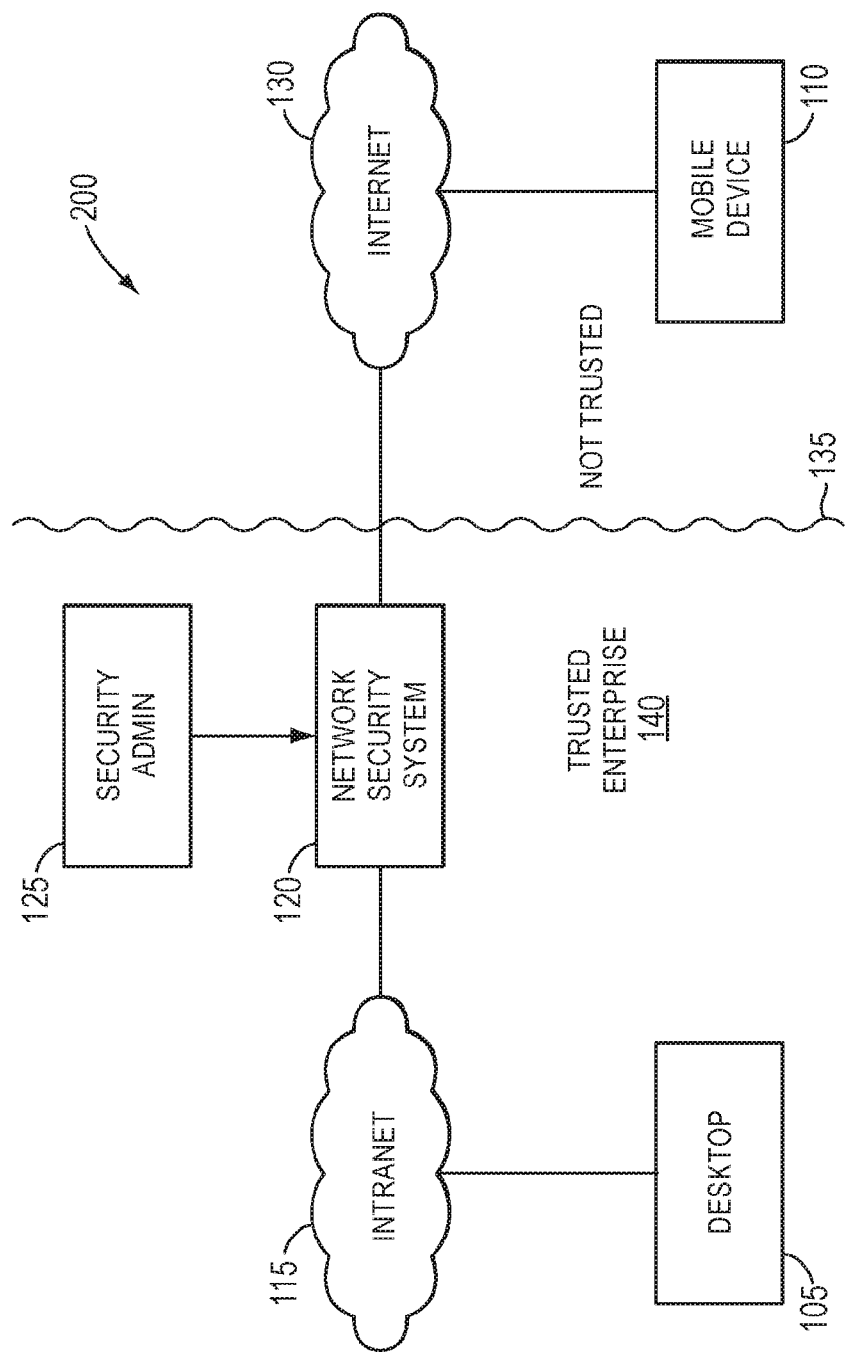
FIG. 2 is a block diagram of a prior art network system in a second state.
Figure 3:
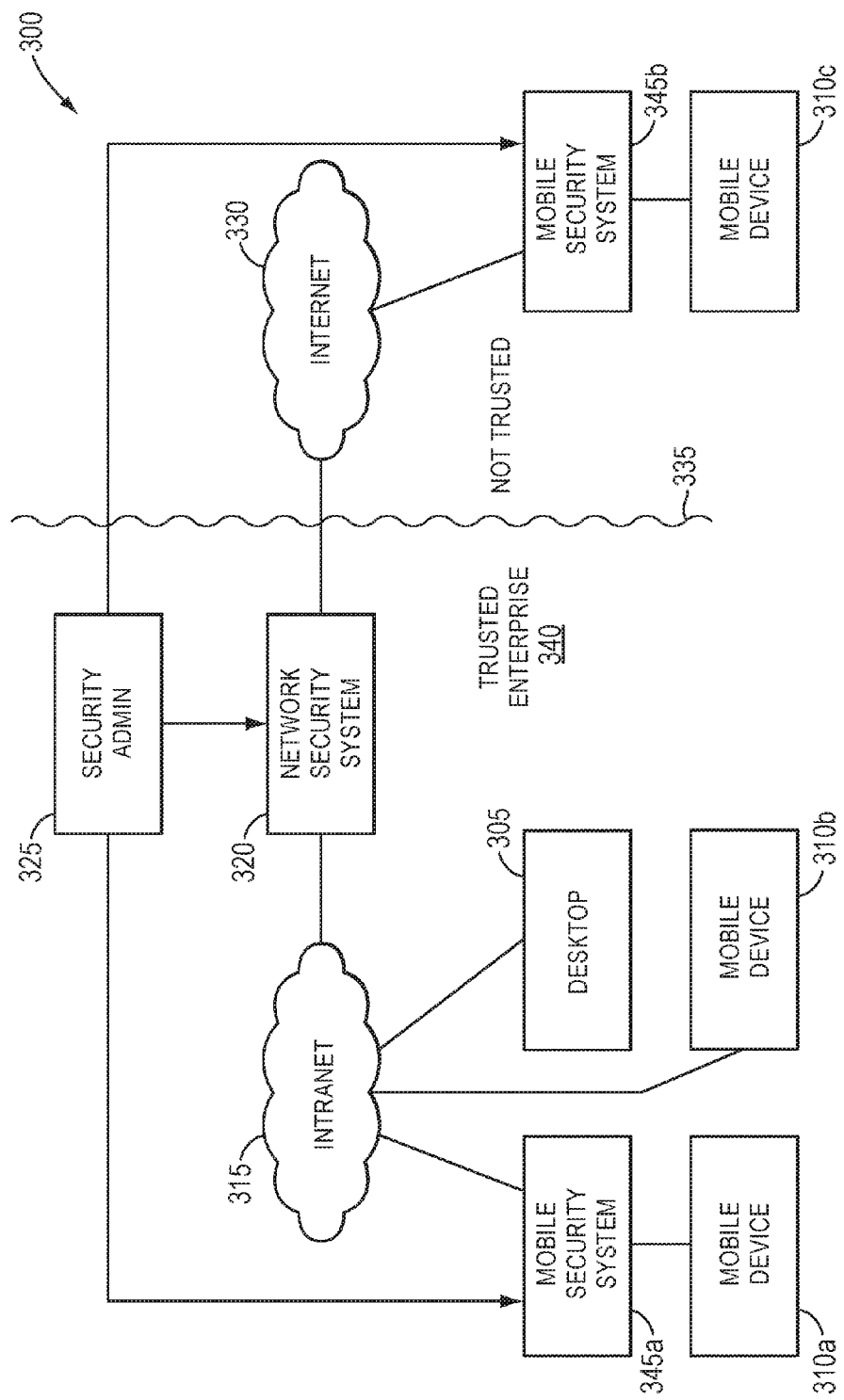
FIG. 3 is a block diagram of a network system in accordance with an embodiment of the present invention.

FIG. 3 illustrates a network system 300 in accordance with an embodiment of the present invention. Network system 300 includes a desktop 305, a first mobile device 310a, and a second mobile device 310b. The first mobile device 310a is illustrated as within the enterprise network 340 at this time and is coupled via a mobile security system 345a to the enterprise's intranet 315. The desktop 305 and second mobile device 310b are also within the enterprise network 340 but in this embodiment are coupled to the intranet 315 without an intervening mobile security system 345 such as mobile security system 345b. The intranet 315 is coupled via a network security system 320 (which may be part of the enterprise's gateway) to the untrusted internet 330. Accordingly, the first mobile device 310a, the second mobile device 310b and the desktop 305 access the untrusted internet 330 via the network security system 320. Each may also be protected by a personal security system resident thereon (not shown). A third mobile device 310c is currently outside the enterprise network 340 and is coupled via a mobile security system 345b to the untrusted internet 330. The third mobile device 310 may be in use by an employee of the trusted enterprise 340 who is currently on travel. A security administrator 325 manages the mobile security system 345a, the mobile security system 345b, and the network security system 320 to assure that they include the most current security protection. One skilled in the art will recognize that the same security administrator need not manage the various devices. Further, the security administrator could be the user and need not be within the trusted enterprise 340.

Demarcation 335 divides the trusted enterprise 340 and the untrusted publicly accessible internet 330. Each of mobile device 310a, 310b and 310c may be referred to generically as mobile device 310, although they need not be identical. Each mobile security system 345a and 345b may be referred to generically as mobile security system 345, although they need not be identical.

As shown, although the mobile device 310c has traveled outside the trusted enterprise 340, the mobile device 310c connects to the untrusted internet 330 via the mobile security system 345b and thus retains two lines of defense (namely, the mobile security system 345b and the security software resident on the device itself). In this embodiment, the mobile security system 345 effectively acts as a mobile internet gateway on behalf of the mobile device 310c. In an embodiment, the mobile security system 345 may be a device dedicated to network security. In an embodiment, each mobile security system 345 may support multiple mobile devices 310, and possibly only registered mobile devices 310, e.g., those belonging to enterprise 340.

Each mobile security system 345 (e.g., 345a, 345b) may be a miniature server, based on commercial hardware (with Intel's Xscale as the core), Linux OS and network services, and open-source firewall, IDS/IPS and antivirus protection. The mobile security system 345 may be based on a hardened embedded Linux 2.6.

In this embodiment, because the security administrator 325 is capable of remotely communicating with the mobile security system 345b, IT can monitor and/or update the security policies/data/engines implemented on the mobile security system 345b. The security administrator 325 can centrally manage all enterprise devices, remotely or directly. Further, the security administrator 325 and mobile security systems 345 can interact to automatically translate enterprise security policies into mobile security policies and configure mobile security systems 345 accordingly. Because the mobile security system 345 may be generated from the relevant security policies of the enterprise 340, the mobile device 310c currently traveling may have the same level of protection as the devices 305/310 within the trusted enterprise 340.

Figure 8:
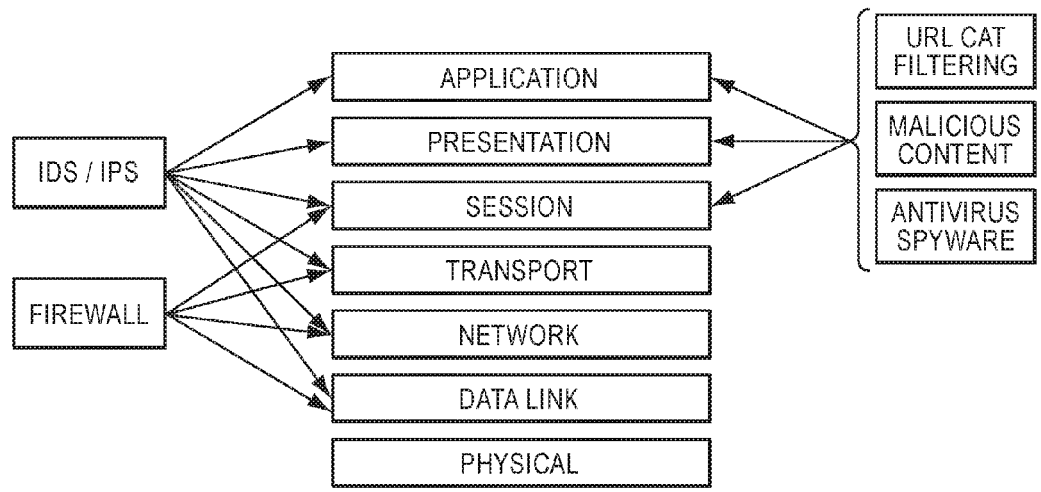
FIG. 8 is a block diagram illustrating details of network security measures relative to the OSI layers.

The mobile security system 345 may be designed as an add-on to existing software security or to replace all security hardware and software on a traveling mobile device. These security applications will preferably operate on different OSI layers to provide maximum security and malicious code detection, as shown in the example system illustrated in FIG. 8. Operating on the lower OSI layers and doing TCP/IP packets analysis only (by screening firewall or router packets) would miss virus and/or worm behavior. Also, many modern viruses use mobile code implemented on a "higher" level than the $7^{th}$ OSI layer (Application—HTTP, FTP, etc.) and therefore cannot be interpreted at the packet layer nor at the application layer. For example, applying antivirus analysis only at the session or transport layer on a malicious Java Script (that is included in an HTML page), trying to match the signature with packets and without understanding the content type (Java Script), will not detect the malicious nature of the Java Script. To offer greater protection, the mobile security system 345 may act as corporate class security appliance and engage different security applications based on the content type and the appropriate OSI layers, (or even a "higher" level if content is encapsulated in the application layer). The mobile security system 345 may be configured to perform content analysis at different OSI layers, e.g., from the packet level to the application level. It will be appreciated that performing deep inspection at the application level is critical to detect malicious content behavior and improve detection of viruses, worms, spyware, Trojan horses, etc. The following software packages may be implemented on the mobile security system 345:

Firewall and VPN—including stateful and stateless firewalls, NAT, packet filtering and manipulation, DOS/DDOS, netfilter, isolate user mobile devices from the internet and run VPN program on the device, etc.

Optional web accelerator and bandwidth/cache management based on Squid.

IDS/IPS—Intrusion detection and prevention system based on Snort. Snort is an open source network intrusion prevention and detection system utilizing a rule-driven language, which combines the benefits of signature, protocol- and anomaly-based inspections.

Antivirus and antispyware based on ClamAV; additional AV and AS engines, e.g., McAfee, Kaspersky, Pandamay, may be offered for additional subscription fees.

Malicious Content Detection—on the fly heuristics that perform content analysis to detect malicious content before having signatures. This will be based on a rule base and updated rules and will be content dependent scanning.

URL Categorization Filtering—based on a commercial engine, such as Surfcontrol, Smart Filters or Websense. May provide around 70 categories of URLs such as gambling, adult content, news, webmail, etc. The mobile device 345 may apply different security policies based on the URL category, e.g., higher restriction and heuristics for Gambling or Adult content web sites, etc.

Figure 4:
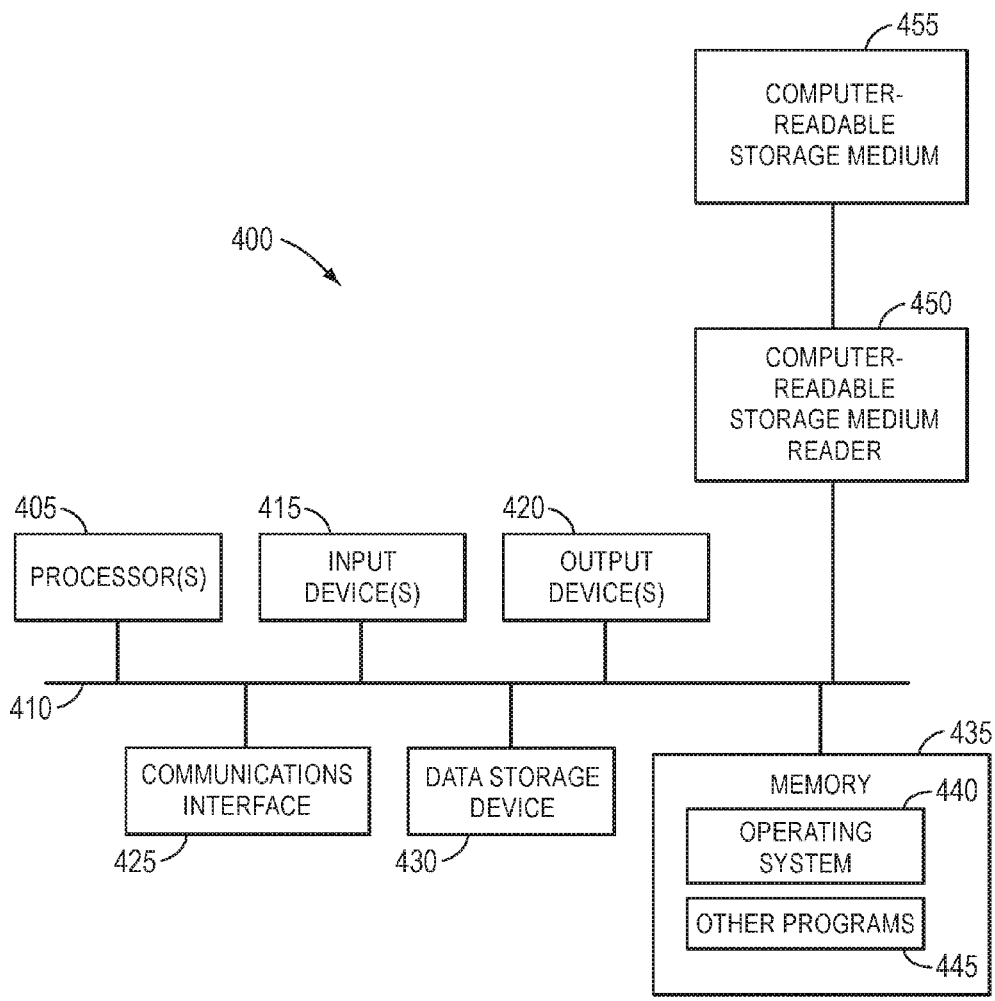
FIG. 4 is a block diagram illustrating details of a computer system in accordance with an embodiment of the present invention.

FIG. 4 is a block diagram illustrating details of an example computer system 400, of which each desktop 305, mobile device 310, network security system 320, mobile security system 345, and security administrator 325 may be an instance. Computer system 400 includes a processor 405, such as an Intel Pentium® microprocessor or a Motorola Power PC® microprocessor, coupled to a communications channel 410. The computer system 400 further includes an input device 415 such as a keyboard or mouse, an output device 420 such as a cathode ray tube display, a communications device 425, a data storage device 430 such as a magnetic disk, and memory 435 such as Random-Access Memory (RAM), each coupled to the communications channel 410. The communications interface 425 may be coupled directly or via a mobile security system 345 to a network such as the internet. One skilled in the art will recognize that, although the data storage device 430 and memory 435 are illustrated as different units, the data storage device 430 and memory 435 can be parts of the same unit, distributed units, virtual memory, etc.

The data storage device 430 and/or memory 435 may store an operating system 440 such as the Microsoft Windows XP, the IBM OS/2 operating system, the MAC OS, UNIX OS, LINUX OS and/or other programs 445. It will be appreciated that a preferred embodiment may also be implemented on platforms and operating systems other than those mentioned. An embodiment may be written using JAVA, C, and/or C++ language, or other programming languages, possibly using object oriented programming methodology.

One skilled in the art will recognize that the computer system 400 may also include additional information, such as network connections, additional memory, additional processors, LANs, input/output lines for transferring information across a hardware channel, the internet or an intranet, etc. One skilled in the art will also recognize that the programs and data may be received by and stored in the system in alternative ways. For example, a computer-readable storage medium (CRSM) reader 450 such as a magnetic disk drive, hard disk drive, magneto-optical reader, CPU, etc. may be coupled to the communications bus 410 for reading a computer-readable storage medium (CRSM) 455 such as a magnetic disk, a hard disk, a magneto-optical disk, RAM, etc. Accordingly, the computer system 400 may receive programs and/or data via the CRSM reader 450. Further, it will be appreciated that the term "memory" herein is intended to cover all data storage media whether permanent or temporary.

Figure 5:
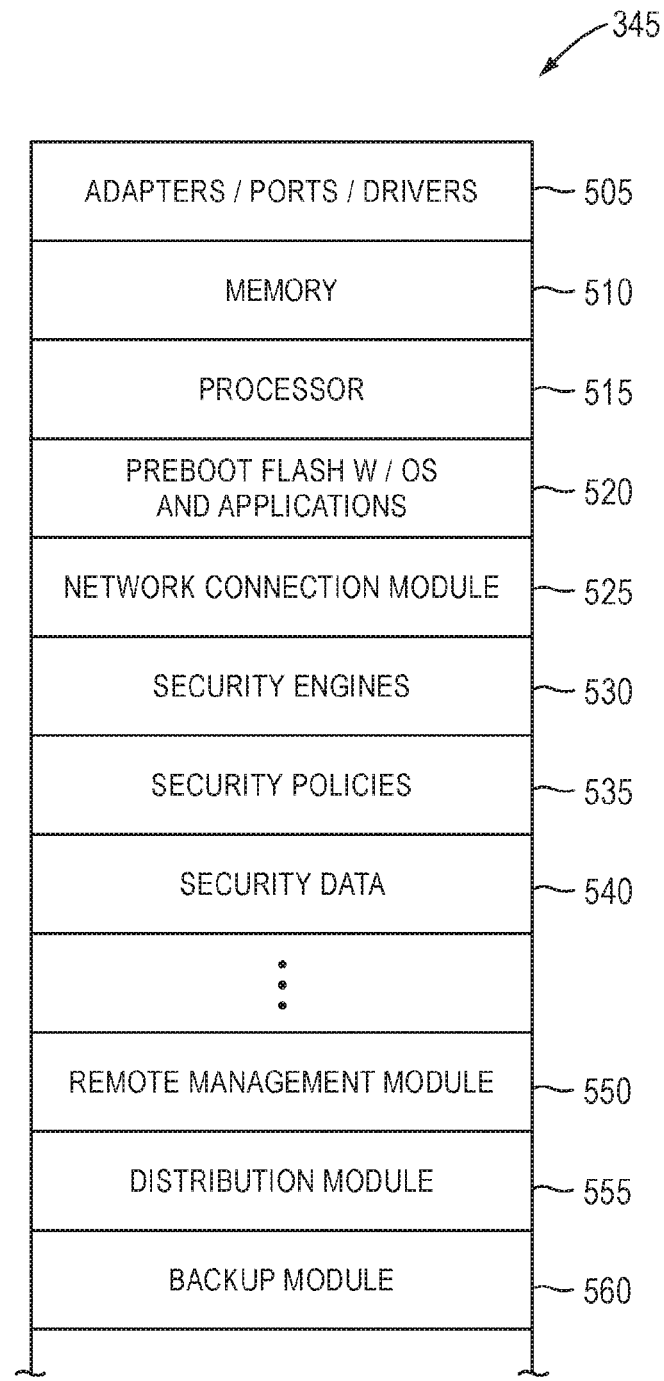
FIGS. 5 and 5A are block diagrams illustrating details of the mobile security system in accordance with an embodiment of the present invention.

FIG. 5 is a block diagram illustrating details of the mobile security system 345 in accordance with an embodiment of the present invention. Mobile security system 345 includes adapters/ports/drivers 505, memory 510, a processor 515, a preboot flash/ROM memory module 520 storing a secure version of the mobile security system's operating system and other applications, network connection module 525, security engines 530, security policies 535, security data 540, remote management module 550, distribution module 555, and backup module 560. Although these modules are illustrated as within the mobile security system 345, one skilled in the art will recognize that many of them could be located elsewhere, e.g., on the security administrator 325 or on third-party systems in communication with the mobile security system 345. The mobile security system 345 may be in a pocket-size, handheld-size or key-chain size housing, or possibly smaller. Further, the mobile security system 345 may be incorporated within the mobile device 310.

The adapters/ports/drivers 505 include connection mechanisms (including software, e.g., drivers) for USB, Ethernet, WiFi, WiMAX, GSM, CDMA, BlueTooth, PCMCIA and/or other connection data ports on the mobile security system 345. In one embodiment, the adapters/ports/drivers 505 may be capable of connection to multiple devices 310 to provide network security to the multiple devices 310.

Memory 510 and processor 515 execute the operating system and applications on the mobile security system 345. In this example, the preboot flash 520 stores the operating system and applications. At boot time, the operating system and applications are loaded from the preboot flash 520 into memory 510 for execution. Since the operating system and applications are stored in the preboot flash 520, which cannot be accessed during runtime by the user, the operating system and applications in the preboot flash 520 are not corruptible. Should the copy of the operating system and applications in memory 510 be corrupted, e.g., by malicious code, the operating system and applications may be reloaded into the memory 510 from the preboot flash 520, e.g., upon restart. Although described as stored within the preboot flash 520, the OS and applications can be securely stored within other read-only memory devices, such as ROM, PROM, EEPROM, etc.

Figure 5A:
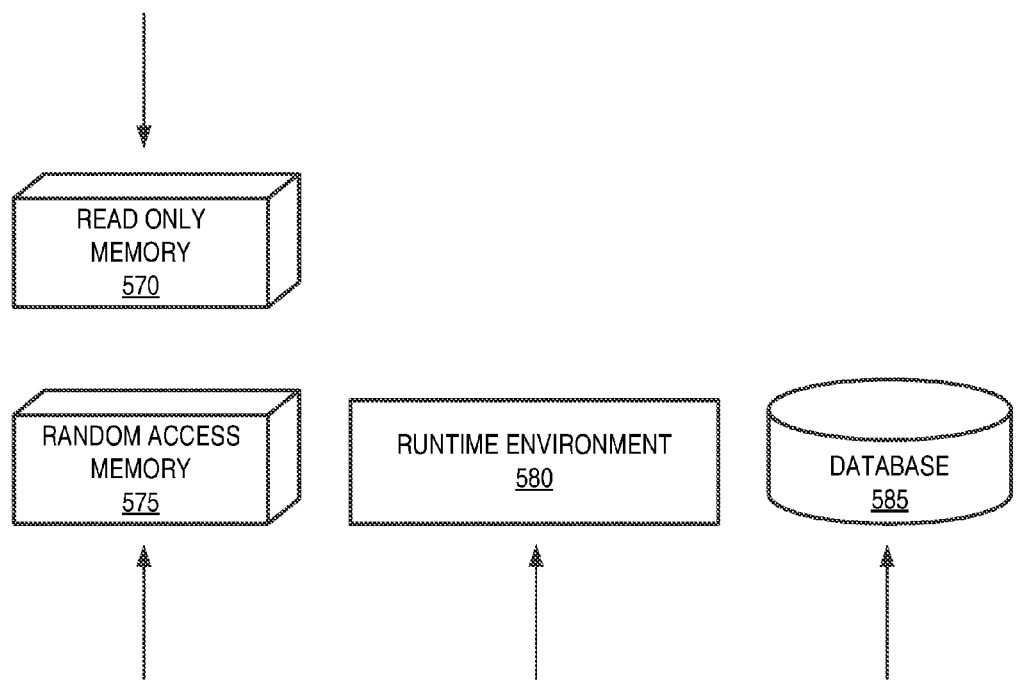

As shown in FIG. 5A, memory (including memory 510 and preboot flash 520) on the mobile security system 345 may be divided into the following zones: read only memory 570; random access memory 575 for storing a copy of the OS, kernel and security applications; runtime environment 580; and database 585 for storing application data, log files, etc. Upon each "hard" restart, the boot loader (resident in read only memory 570) of the mobile security system 345 copies the kernel and security applications (a fresh unchanged copy) from read only memory 570 to random access memory 575. This causes a clean version of the OS and applications to be loaded into random access memory 575 each time. That way, if a special attack on mobile security system 345 is developed, the attack will be unable to infect the system, since the OS and applications are precluded from accessing read only memory 570 during runtime. Further, any attack that does reach memory 510 will be able to run only once and will disappear upon a hard restart. A triggering mechanism may be available to restart the mobile security system 345 automatically upon infection detection.

The network connection module 525 enables network connection, e.g., to the internet 330 or the intranet 315 via network communication hardware/software including WiFi, WiMAX, CDMA, GSM, GPRS, Ethernet, modem, etc. For example, if the mobile device 310 wishes to connect to the internet 330 via a WiFi connection, the adapters/ports/drivers 505 may be connected to the PCI port, USB port or PCMCIA port of the mobile device 310, and the network connection module 525 of the mobile security system 345 may include a WiFi network interface card for connecting to wireless access points. Using the network connection module 425, the mobile security system 345 may communicate with the network as a secure gateway for the mobile device 310. Other connection architectures are described in FIGS. 10A-10C.

The security engines 530 execute security programs based on the security policies 535 and on security data 540, both of which may be developed by IT managers. Security engines 530 may include firewalls, VPN, IPS/IDS, antivirus, antispyware, malicious content filtering, multilayered security monitors, Java and bytecode monitors, etc. Each security engine 530 may have dedicated security policies 535 and security data 540 to indicate which procedures, content, URLs, system calls, etc. the engines 530 may or may not allow. The security engines 530, security policies 535 and security data 540 may be the same as, a subset of, and/or developed from the engines, policies and data on the network security system 320.

To provide a higher security level provided by antivirus and antispyware software, the security engines 530 on each mobile security system 345 may implement content analysis and risk assessment algorithms. Operating for example at OSI Layer 7 and above (mobile code encapsulated within Layer 7), these algorithms may be executed by dedicated High Risk Content Filtering (HRCF) that can be controlled by a rules engine and rule updates. The HRCF will be based on a powerful detection library that can perform deep content analysis to verify real content types. This is because many attacks are hidden within wrong mime types and/or may use sophisticated tricks to present a text file type to a dangerous active script or ActiveX content type. The HRCF may integrate with a URL categorization security engine 530 for automatic rule adjustment based on the URL category. In one embodiment, when the risk level increases (using the described mechanism) the mobile security system 345 may automatically adjust and increase filtering to remove more active content from the traffic. For example, if greater risk is determined, every piece of mobile code, e.g., Java script, VB script, etc. may be stripped out.

Three aspects for integration with corporate policy server legacy systems include rules, LDAP and active directory, and logging and reporting as discussed below. In one embodiment, a policy import agent running on the security administrator 325 will access the rule base of Checkpoint Firewall-1 and Cisco PIX Firewalls and import them into a local copy. A rule analysis module will process the important rules and will offer out-of-the-box rules and policies for mobile security systems 345. This proposed policy will offer all mobile security systems 345 a best fit of rules that conform the firewall policy of the enterprise 340. The agent will run periodically to reflect any changes and generate updates for mobile security system 345 policies 535. The LDAP and Active Directory may be integrated with the directory service to maintain mobile security system 345 security policies 535 that respond to the enterprise's directory definitions. For example, a corporate policy for LDAP user Group "G" may automatically propagate to all mobile security systems 345 in "G" group. Mobile security system 345 local logs and audit trails may be sent in accordance to a logging and reporting policy to a central log stored at the security administrator 325. Using a web interface, IT may be able to generate reports and audit views related to all mobile device 310 users, their internet experiences, and attempts to bring infected devices back to the enterprise 340. IT will be able to forward events and log records into legacy management systems via SYSLOG and SNMP Traps.

The security engines 530 may perform weighted risk analysis. For example, the security engine 530 may analyze HTTP, FTP, SMTP, POP3, IM, P2P, etc. including any traffic arriving from the internet 330. The security engine 530 may assign a weight and rank for every object based on its type, complexity, richness in abilities, source of the object, etc. The security engine 530 may assign weight based on the source using a list of known dangerous or known safe sources. The security engine 530 may assign weight to objects based on the category of the source, e.g., a gambling source, an adult content source, a news source, a reputable company source, a banking source, etc. The security engine 530 may calculate the weight, and based on the result determine whether to allow or disallow access to the content, the script to run, the system modification to occur, etc. The security engine 530 may "learn" user content (by analyzing for a predetermined period of time the general content that the user accesses) and accordingly may create personal content profiles. The personal content profile may be used to calibrate the weight assigned to content during runtime analysis to improve accuracy and tailor weighted risk analysis for specific user characteristics.

In some embodiments, the security engines 530, security policies 535 and security data 540 may enable bypassing the mobile security system 345. The security policy 535, set by the security administrator 325, may include a special attribute to force network connection through the mobile security system 325 when outside the trusted enterprise 340. Thus, if this attribute is set "on." when a mobile device 310 attempts to connect to the internet 330 without the mobile security system 345 and not from within the trusted enterprise 340, all data transfer connections including LAN connection, USB-net, modem, Bluetooth, WiFi, etc. may be closed. The mobile device 310 may be totally isolated and unable to connect to any network, including the internet 330.

Figure 6:
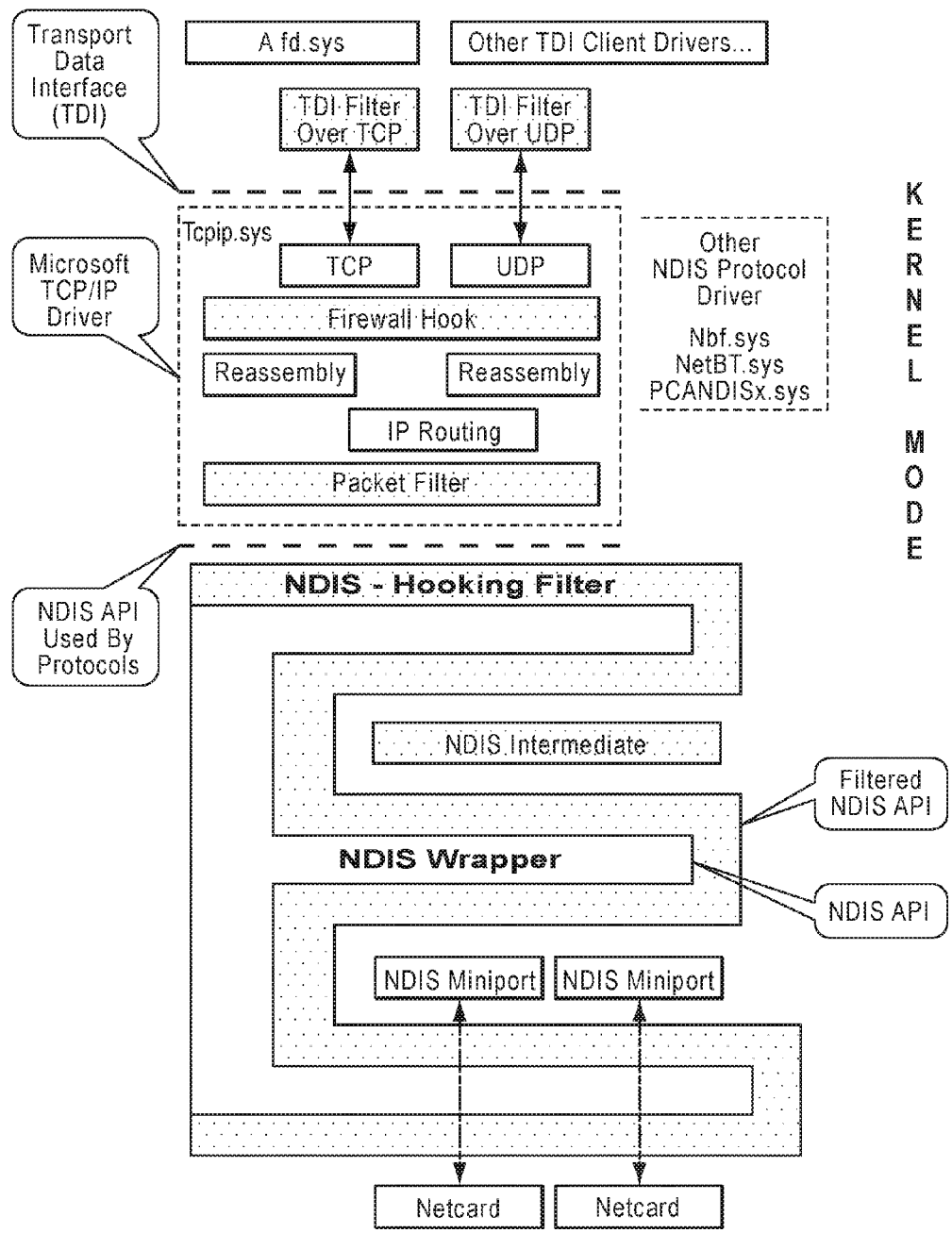
FIG. 6 is a block diagram illustrating details of the mobile security system in accordance with a Microsoft Window's embodiment.

In one embodiment, to enable this, when first connecting the mobile security system 345 to the mobile device 310 using for example the USB cable (for both power and USB connection creation), the USB plug & play device driver will be sent into the mobile device 310. The installed driver may be "Linux.inf" which allows a USB-net connection for the mobile security system 345. This connection allows the mobile security system 345 to access the internet 330 via the USB port and using the mobile device 310 network connection plus additional code ("the connection client"). In a Windows example, the connection client may be installed at the NDIS level of the mobile device 310 above all the network interface cards of every network connection as shown in FIG. 6. The implementation will be as an NDIS Intermediate (IM) Driver or NDIS-Hooking Filter Driver. Both implementations may be at the kernel level, so that an end user cannot stop or remove it. When starting the mobile device 310, the connection client may attempt to connect to the security administrator 325 or the network security system 320 locally within the trusted enterprise 340. If the node is not found (finding via VPN is considered as not found in local LAN), the connection client will assume it is working from outside the trusted enterprise 340 and expects to find the mobile security system 345 connected, e.g., via USB-net or other connection mechanism. If the mobile security system 345 is not found, the connection client may avoid any communication to any network connection. By a policy definition, this behavior can be modified to allow communication to the enterprise 340 via VPN installed in the mobile device 310. Similarly, in case of a mobile device system 345 failure, all traffic may be disabled, except for the VPN connection into the enterprise 340.

It will be appreciated that NDIS is one possible implementation of intercepting traffic at the kernel level. For example, in another embodiment, the system may hook Winsock or apply other ways that may be in future Windows versions.

In an embodiment where the mobile security system 345 supports multiple mobile devices 310, the security engines 530, security policies 535 and security data 540 may be different for each mobile device 310 (e.g., based on for example user preferences or IT decision). Alternatively, it can apply the same engines 530, policies 535 and data 540 for all connected devices 310.

The remote management module 550 enables communication with security administrator 325 (and/or other security administrators), and enables local updating of security engines 530, security policies 535, security data 540 including signatures and other applications. In one embodiment, modification to the security policies 535 and data 540 can be done by the security administrator 325 only. The remote management module 550 of the mobile security system 345 may receive updates from an update authorities device (UAD), e.g., on the security administrator 325 via a secured connection. A UAD may operate on an update server at a customer IT center located on the internet 330 to forward updates to mobile security systems 345 that possibly do not belong to an enterprise 540 in charge of managing updates. A UAD may operate on a mobile security system 345. Security engine 530 updates may modify the antivirus engine DLL, etc. OS and security application updates may be implemented only from within the enterprise 540 while connecting to the security administrator 325 and via an encrypted and authenticated connection.

The security administrator 325 can modify URL black and white lists for remote support to traveling users. In case of false positives, the security administrator 325 may allow access to certain URLs, by bypassing the proactive heuristics security but still monitoring by firewall, antivirus, IPS/IDS, etc. Additional remote device-management features may enable the security administrator 325 to perform remote diagnostics, access local logs, change configuration parameters, etc. on the mobile security system 345. The security administrator 325 may delegate tasks to a helpdesk for support.

Figure 7:
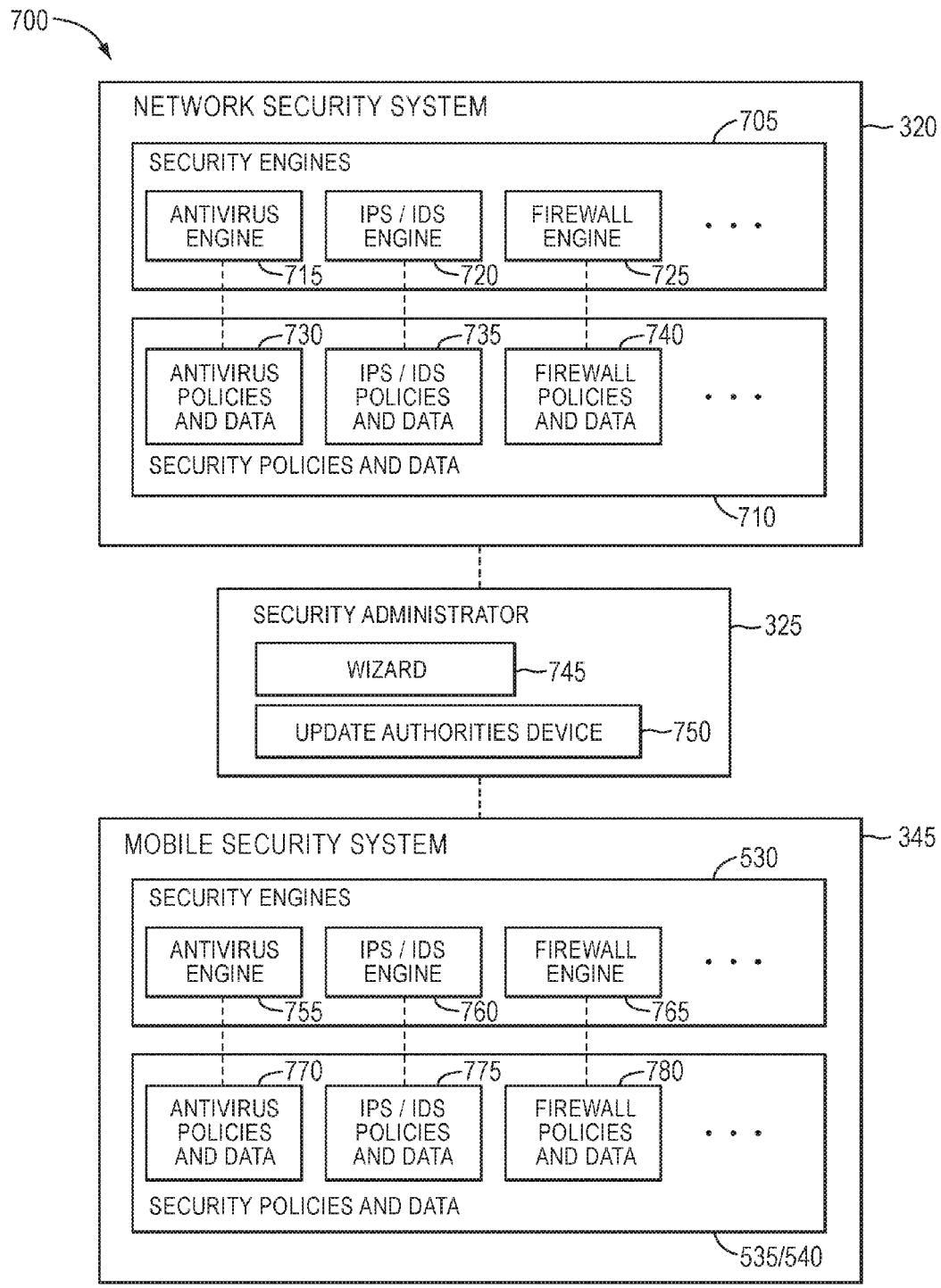
FIG. 7 is a block diagram illustrating details of a smart policy updating system in accordance with an embodiment of the present invention.

The remote management module 550 may communicate with a wizard (e.g., wizard 745), which may be on the security administrator 325, as illustrated in FIG. 7, or on another system. Details of the wizard 745 and details of the communication schemes between the remote management module 550 and the wizard 745 are described below with reference to FIG. 7.

The distribution module 555 enables distribution of updates, e.g., security policy 535 updates including rule updates, security data 540 updates including signature updates, security engine 530 updates, application/OS updates, etc. by the mobile security system 345 to N other mobile security systems 345. A routing table identifying the N other mobile security systems 345 to whom to forward the updates may be provided to the distribution module 555 to enable system 345 to system 345 communication. Updates may be implemented according to policies set by the security administrator 325. When forwarding updates, the distribution module 555 acts as a UAD.

Each mobile security system 345 may obtain its routing table with security information updates, periodically, at predetermined times, upon login, etc. The routing tables may be maintained on a server, e.g., the security administrator 325 or another mobile security system 345. In one embodiment, the mobile security systems 345 may contact the server to retrieve the routing tables. Alternatively, the server may push the routing tables to the mobile security systems 345.

Figure 9:
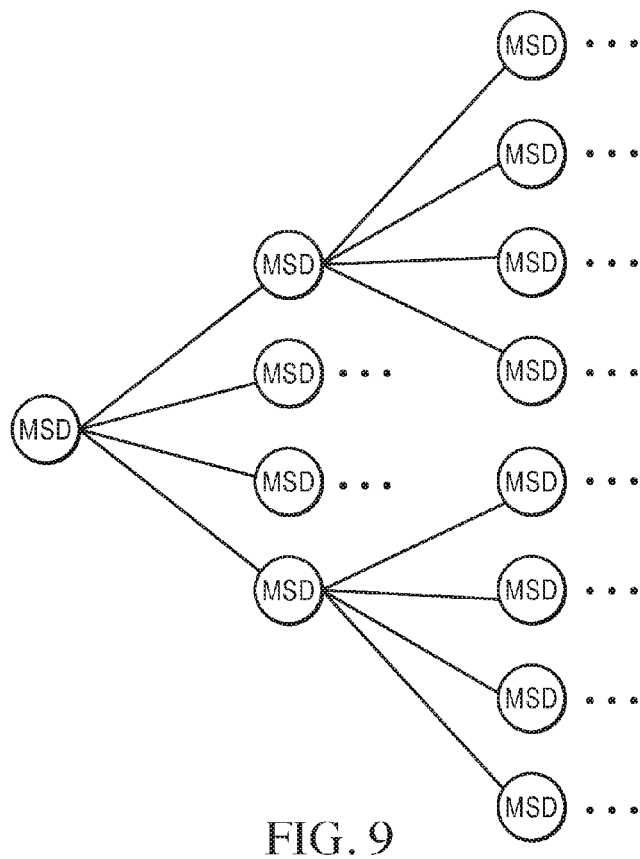
FIG. 9 is a block diagram illustrating details of the communication technique for spreading security code to the mobile security systems.

The distribution module 555 may enable rapid updates as shown in FIG. 9. Currently, all commercial antivirus products available do not update devices faster than viruses spread. To assure that a new virus attack does not spread faster than for example signature updates, each mobile security system 345 may be an active UAD. In one embodiment, as shown in FIG. 9, each mobile security system 345 is responsible for forwarding the signature updates to four other devices 345. As one skilled in the art will recognize, all devices 345 need to forward to the same number of other devices 345. Multiple devices 345 may be responsible for forwarding to the same device 345. When necessary, offline devices 345 being activated may poll the server, e.g., the security administrator 325, for routing table updates. Many other updating techniques are also possible.

The backup module 560 may constantly back-up image and changes of the boot sector and system files of the mobile device 310 into the flash memory 520 or into another persistent memory device. That way, in case of major failure, including a loss of the system or boot sector of the mobile device 310, the mobile security system 345 may be identified as a CD-ROM during reboot and may launch the backup module (or separate program) to restore the boot sector and system files on the mobile device 310, thereby recovering the mobile device 310 without the need for IT support. In an embodiment where the network security system 345 supports multiple mobile devices 310, the backup module 560 may contain separate boot sector and system files for each of the mobile devices 310, if different.

FIG. 7 is a block diagram illustrating details of a smart policy updating system 700 in accordance with an embodiment of the present invention. System 700 includes the security administrator 325 coupled to the network security system 320 and to the mobile security system 345. The network security system 320 includes security engines 705, including an antivirus engine 715, an IPS/IDS engine 720, a firewall engine 725, and other security engines. The network security system 320 also includes security policies and data 710, including antivirus policies and data 730, IPS/IDS policies and data 735, firewall policies and data 740, and other policies and data. Similarly, the mobile security system 345 includes an antivirus engine 755, an IPS/IDS engine 760, a firewall engine 765, and other engines. The mobile security system 345 also includes security policies and data 535/540, including antivirus security policies and data 770, IPS/IDS security policies and data 775, firewall security policies and data 780, and other security policies and data.

The security administrator 325 includes a wizard 745 for enabling substantially automatic initial and possibly dynamic setup of the security engines 530, security policies 535 and security data 540 on the mobile security system 345. In one embodiment, the wizard 745 may automatically load all security engines 705 and policies and data 710 of the network security system 320 as the security engines 530 and policies and data 535/540 on the mobile security system 345. In another embodiment, the wizard 745 may include all security engines 705 and policies and data 710 except those known to be irrelevant, e.g., those related to billing software used by accounting, those relating to web software running only on the web servers, etc. In another embodiment, the engines 530 would need to be loaded by an IT manager, and would not be loaded automatically by the wizard 745.

In one embodiment, the wizard 745 may determine whether the mobile security system 345 requires a particular security engine 530, e.g., an antivirus engine 755, IPS/IDS engine 760, firewall engine 765, etc. If so determined, then the wizard 745 would load the engine 530 onto the mobile security system 345. The wizard 745 would then determine which policies and data sets, e.g., some for antivirus engine 755, some for the IPS/IDS engine 760, some for the firewall engine 765, etc. are important to the mobile security system 345. The wizard 745 will then determine which of the antivirus policies and data 730 on the network security system 320 are relevant to the antivirus policies and data 770 on the mobile security system 345, which of the IPS/IDS policies and data 735 on the network security system 320 are relevant to the IPS/IDS policies and data 775 on the mobile security system 345, which of the firewall policies and data 740 on the network security system 320 are relevant to the firewall policies and data 780 on the mobile security system 345, and which of the other policies and data on the network security system 320 are relevant to the policies and data on the mobile security system 345. As stated above, the wizard 745 may determine that all security engines 705 or just a subset are needed on the mobile security system 345. The wizard 745 may determine that all policies and data 710 for a given engine type or just a subset should be forwarded. The wizard 745 may determine which relevant policies and data 710 should be forwarded to the mobile security system 345 based on rules developed by an IT manager, based on item-by-item selection during the setup procedure, etc. Alternative to the wizard 745, an IT manager can setup the engines 530 and policies and data 535/540 on the mobile security system 345 without the wizard 745.

The security administrator 325 may also include an update authorities device 750. The update authorities device 750 may obtain security system updates (e.g., signature updates) and may send the updates to the network security system 320 and to the mobile security system 345. One skilled in the art will recognize that the updates to the network security system 320 and the updates to the mobile security system 345 need not be the same. Further, the update authorities device 750 may obtain the updates from security managers, security engine developers, antivirus specialists, etc. The update authorities device 750 may forward the updates to all network security systems 320 and all mobile security systems 345, or may forward routing tables to all mobile security systems 345 and the updates only to an initial set of mobile security systems 345. The initial set of mobile security systems 345 may forward the updates to the mobile security systems 345 identified in the routing tables in a P2P manner, similar to the process illustrated in FIG. 9. As stated above, each mobile security system 345 operating to forward updates is itself acting as an update authorities device 750.

Other applications may be included on the mobile security system 345. For example, add-on applications for recurring revenue from existing customers may include general email, anti-spam, direct and secured email delivery, information vaults, safe skype and other instant messaging services, etc.

Email Security and Anti-spam—implementation of mail relay on mobile security systems 345 (including the web security engine above) and a local spam quarantine (based on SendMail or similar process) may implement a complete mail security suite (SMTP and POP3) including anti-spam with real time indexing (via online web spam quarries). Users may have access to the quarantine to review spam messages, release messages, modify and custom spam rules, etc., via a web interface.

Direct and Secured Email Delivery based on mail relay will allow the mobile security system 345 to send user email directly from one mobile security system 345 to another mobile security system 345 without using in route mail servers. This allows corporate users to send emails that need not travel in the internet, thus leaving trace and duplicates on different unknown mail servers in route. This combined with the ability to use a secured pipe between two mobile security systems is valuable to corporations. Without such methodology, people could trace emails exchange without accessing to the enterprise's mail server, by tracking down copies in intermediate mail servers that were used to deliver the messages.

Information Vault—Application to encrypt and store end user information on the mobile security system 345 may be available only to authorized users via a web interface and a web server implemented oil every mobile security system 345 (e.g., BOA, Apache, etc.)

Safe Skype and Other IM—implementing an instant messaging client on the mobile security system 345 can guarantee that the instant messaging system or P2P application has no access to data on the mobile device 310. Adding a chipset of AC/97 to provide a sound interface on the mobile security system 325 could allow users to talk and receive calls directly from/to the mobile security system 325.

Although not shown, a small battery may be included with the mobile security system 345. This battery may be charged by the USB connection during runtime or using the power adapter at any time. The battery may guarantee proper shutdown, e.g., when user disconnects the USB cable from the mobile security system 345. It will be signaled by the system which will launch applications and system shutdown. This will ensure a proper state of the file system and flashing open files buffers.

A multi-layered defense and detection abilities is required. This may be done by a special code that is constantly monitoring the scanning result by different systems (antivirus, IDS/IPS, firewall, antispyware, URL category, etc.) and at different levels to build a puzzle and identify an attack even if it's not recognized by each of the individual subsystems. By doing this, the mobile security system 345 will maintain and in some cases even improve the security level provided within the enterprise 540.

One available benefit of the mobile security system 345 is its ability to enforce the policy of the enterprise 540 on the end user while they are traveling or working from home. Since the mobile security system 345 uses similar security engines and policy as when connected from within the enterprise 540 and since the end user cannot access the internet 330 without it (except via VPN connection into the enterprise 540), IT may be capable of enforcing its security policy beyond the boundaries of the enterprise 540. The OS may be under the entire supervision of IT, while the mobile security system 345 OS acts as an end user OS under his control. This resolves the problems of who controls what and how security and productivity face minimal compromise.

A standalone version of the mobile security system 345 may offer the same functionality, and may provide a local management interface via web browser. Attractive to home users and small offices that lack an IT department, the mobile security system 345 enables the end user to launch a browser, connect to the mobile security system 345, set the different policies (update policy, security rules, etc.) including modifying the white and black URL lists, etc. There is also an opportunity to provide end users with a service of remote management of the mobile security systems 345 by subscription.

Figure 10A:
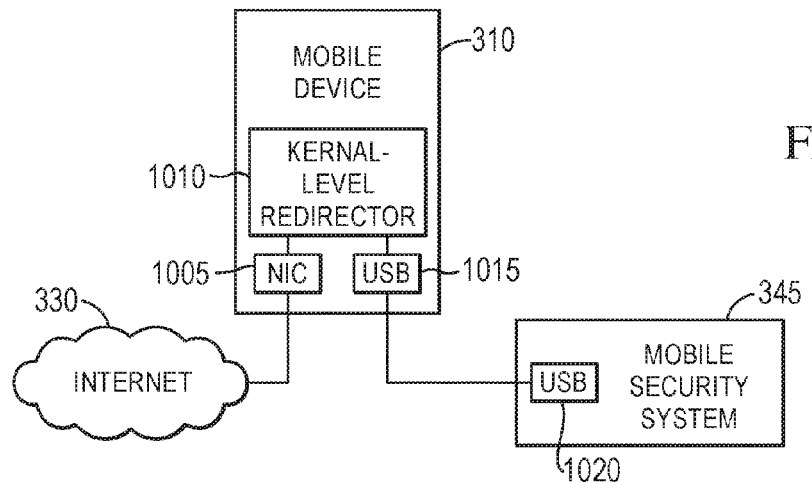
FIGS. 10A-10C are block diagrams illustrating various architectures for connecting a mobile device to a mobile security system, in accordance with various embodiments of the present invention.
Figure 10B:
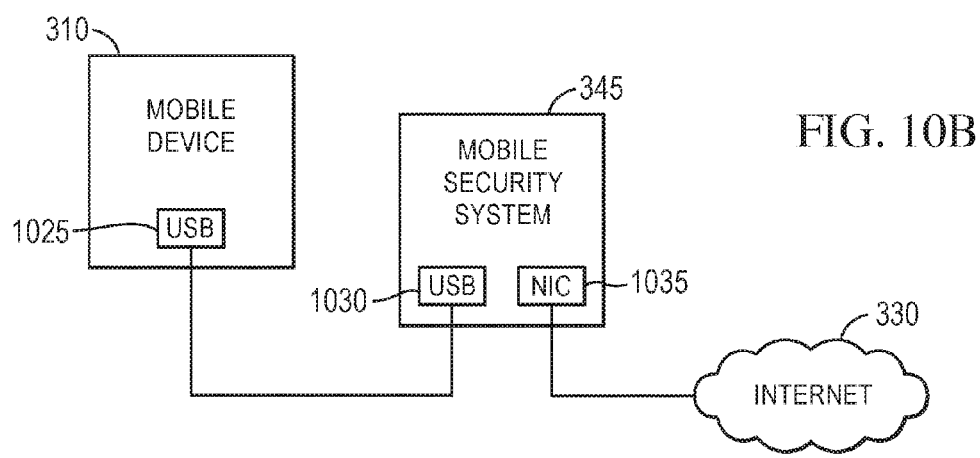
Figure 10C:
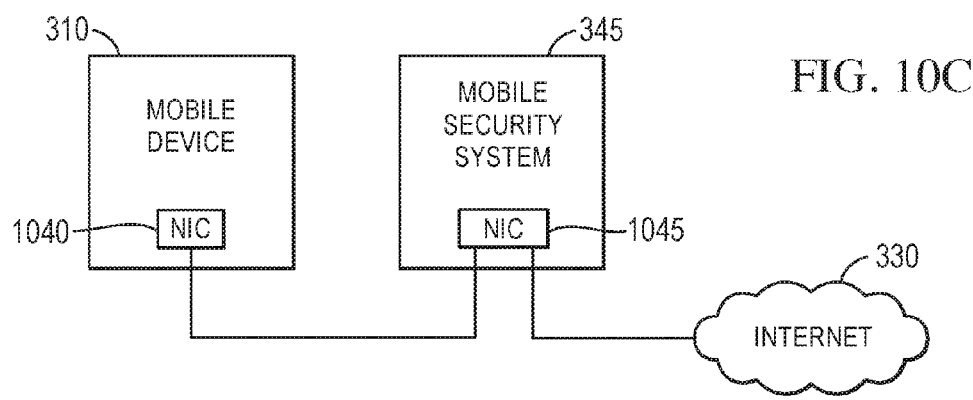
Figure 11:
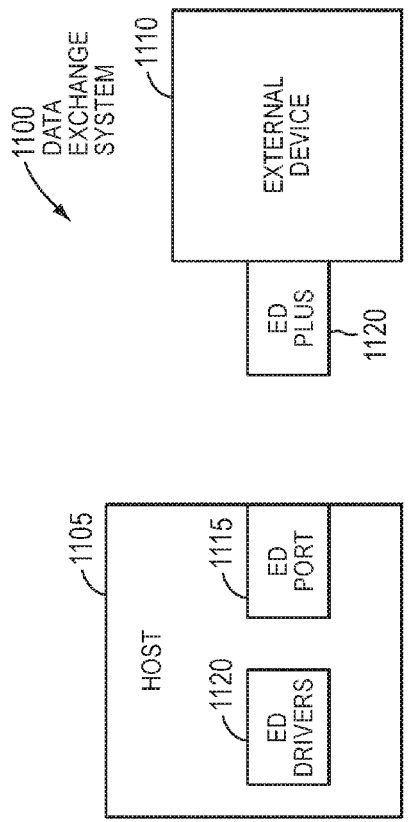
FIG. 11 is a block diagram illustrating a prior art data exchange system.

FIGS. 10A, 10B and 10C illustrate three example architectures of connecting a mobile security system 345 to a mobile device 310, in accordance with various embodiments of the present invention. In FIG. 10A, the mobile device 310 is coupled to the mobile security system 345 via USB connections 1015 and 1020 and is coupled to the internet 330 via a NIC card 1005. The mobile device 310 receives internet traffic from the internet 330 via its NIC card 1005. A kernel-level redirector 1010 (e.g., via NDIS, Winsock, etc.) on the mobile device 310 automatically redirects the interact traffic via the USB connections 1015 and 1020 to the mobile security system 345, which scans, cleans and returns the cleaned internet traffic to the mobile device 310 via the USB connections 1015 and 1020. In FIG. 10B, the mobile device 310 is coupled to the mobile security system 345 via USB connections 1025 and 1030. The mobile security system 345 includes a NIC card 1035 for receiving internet traffic from the internet 330. The mobile security system 345 scans, cleans and forwards the internet traffic via the USB connections 1025 and 1030 to the mobile device 310. In FIG. 10C, the mobile device 310 is coupled to the mobile security system 345 via NIC cards 1040 and 1045. The mobile security system 345 receives internet traffic from the internet 330 via its NIC card 1045. The mobile security system 345 scans, cleans and forwards the internet traffic wirelessly via the NIC cards 1040 and 1045 to the mobile device 310. Other connection architectures are also possible.

Figure 12:
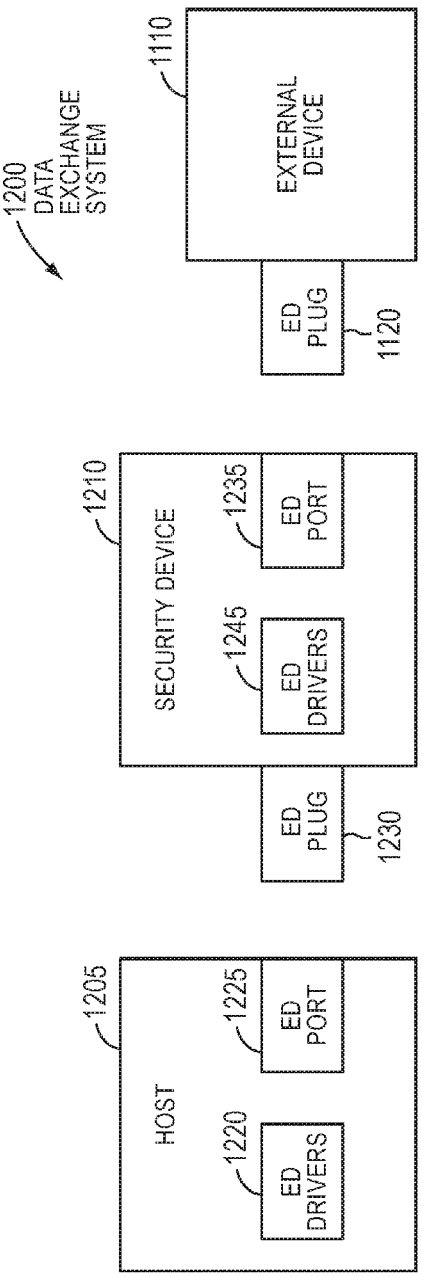
FIG. 12 is a block diagram illustrating a secure data exchange system, in accordance with an embodiment of the present invention.

FIG. 12 is a block diagram illustrating a secure data exchange system 1200, in accordance with an embodiment of the present invention. The secure data exchange system 1200 includes a host computer (host) 1205 coupled via a security device 1210 to an external device 1110. The host 1205 may include a laptop, desktop, PDA, mobile phone, or other processor-based device. The external device 110 may be any external device with memory such as a USB drive, external hard drive, PDA, music player, cell phone, etc. The security device 1210 is communicatively coupled to the host 1205 via an ED port 1225 (USB, serial, parallel, Firewire, Ethernet, WiFi, WiMAX, GSM, CDMA, BlueTooth, PCMCIA and/or other connection) and an ED plug 1230 (USB, serial, parallel, Firewire, Ethernet, WiFi, WiMAX, GSM, CDMA, BlueTooth, PCMCIA and/or other connection). The external device 1110 is communicatively coupled to the security device 1210 via an ED port 1235 (USB, serial, parallel Firewire, Ethernet, WiFi, WiMAX, GSM, CDMA, BlueTooth, PCMCIA and/or other connection) and ED plug 1120 (USB, serial, parallel, Firewire, Ethernet, WiFi, WiMAX, GSM, CDMA, BlueTooth, PCMCIA and/or other connection). The connector type of the ED port 1225 and ED plug 1230 combination may be different that the connector type of the ED port 1235 and ED plug 1120 combination. In one embodiment, all ports 1225/1235 and plugs 1230/1120 are USB. Although the plugs 1120/1230 are illustrated as male and ports 1225/11235 arc shown as female, one skilled in the art will recognize that the opposite is possible (plugs 1120/1230 may be female and ports 1225/1235 may be male).

The host 1205 includes ED drivers 1220 for performing enumeration and enabling communication with the security device 1210. Similarly, the security device 1210 includes ED drivers 1245 for performing enumeration and enabling communication with the external device 1110.

In one embodiment, the security device 1210 includes a programmable hardware appliance capable of enforcing security policies to protect against malicious code such as viruses, spyware, adware, Trojan Horses, etc. and to protect against transfer of private data. In one embodiment, the security device 1210 is configured to protect both the host 1205 and the external device 1215. In one embodiment, the security device 1210 is configured to protect only one of the external device 1110 or the host 1205. Additional details of the security device 1210 are provided with reference to FIGS. 13 and 14.

Figure 13:
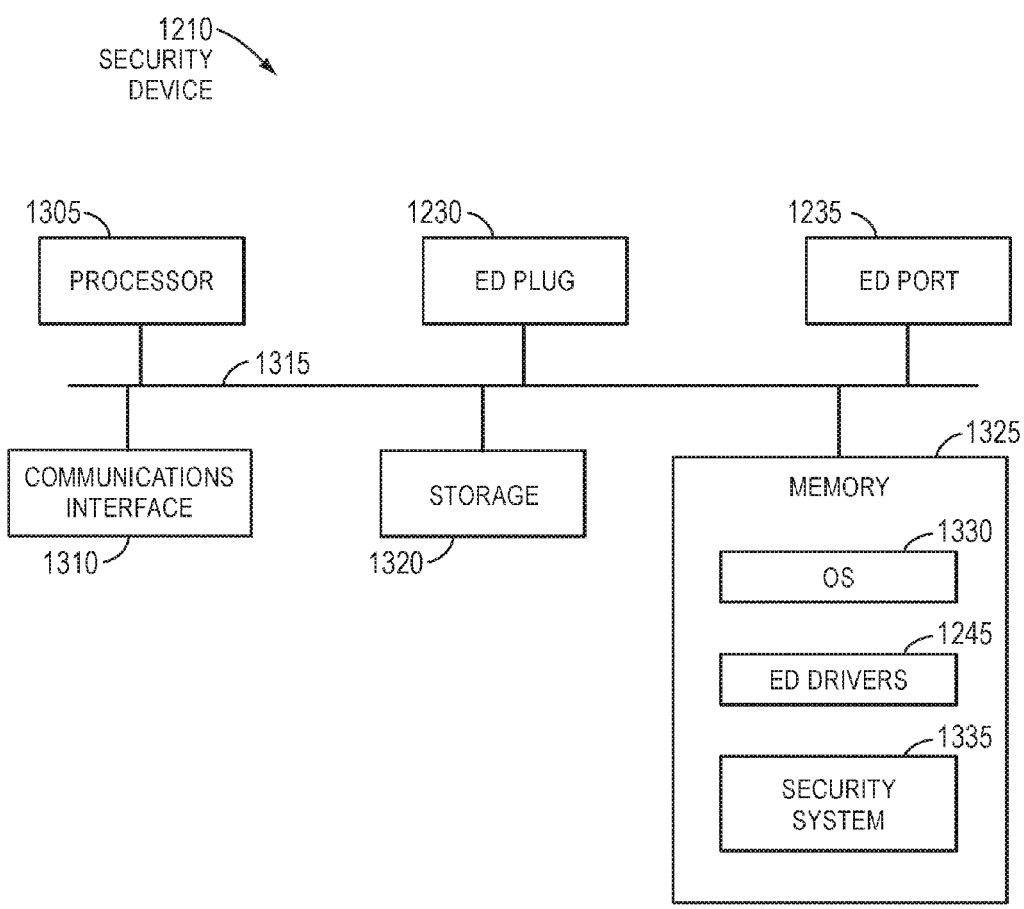
FIG. 13 is a block diagram illustrating details of a security device, in accordance with an embodiment of the present invention.

FIG. 13 is a block diagram illustrating details of the security device 1210, in accordance with an embodiment of the present invention. The security device 1210 includes a processor 1305, such as an Intel Pentium® microprocessor or a Motorola Power PCX microprocessor, coupled to a communications channel 1315. The security device 1210 further includes an ED plug 1230, an ED port 1235, a communications interface 1310, storage 1320 such as an EEPROM, and memory 1325 such as Random-Access Memory (RAM) or Read Only Memory (ROM), each coupled to the communications channel 1315. The communications interface 1310 may be coupled to a network such as the internet. One skilled in the art will recognize that, although the storage 1320 and memory 1325 are illustrated as different units, the data storage device 1320 and memory 1325 can be parts of the same unit, distributed units, virtual memory, etc. The term "memory" herein is intended to cover all data storage media whether permanent or temporary. One skilled in the art will recognize that the security device 1210 may include additional components, such as network connections, additional memory, additional processors, LANs, input/output lines for transferring information across a hardware channel, the internet or an intranet, etc.

As shown, memory 1325 stores an operating system 1330 such as the Microsoft Windows XP, the IBM OS/2 operating system, the MAC OS, Unix OS, Linux OS, etc. It will be appreciated that a preferred embodiment may also be implemented on platforms and operating systems other than those mentioned. An embodiment may be written using JAVA, C, and/or C++ language, or other programming languages, possibly using object oriented programming methodology. The memory 1325 also stores ED drivers 1245 and a security system 1335. The ED drivers 1245 may include standard drivers for standard external devices 1110 and proprietary drivers for proprietary external devices 1110. The ED drivers 1245 may be transferred onto the memory 1325 via ED plug 1230. The security system 1335 includes code for enforcing security policies on data transfer actions between the host 1205 and external device 1110.

Figure 14:
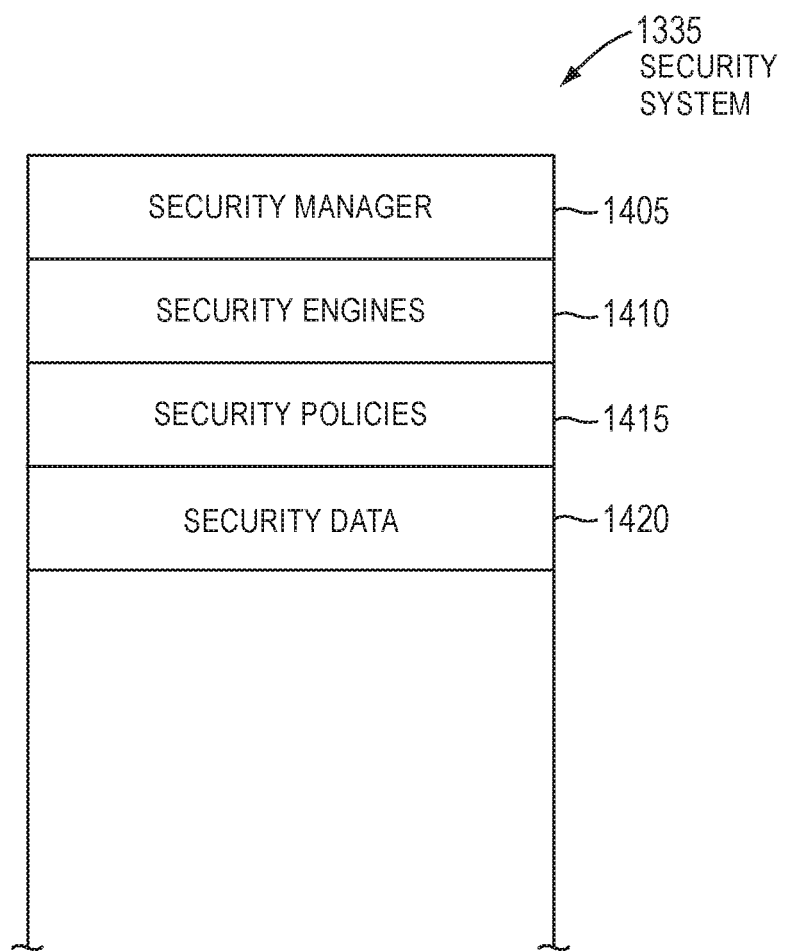
FIG. 14 is a block diagram illustrating details of a security system, in accordance with an embodiment of the present invention.

FIG. 14 is a block diagram illustrating details of a security system 1335, in accordance with an embodiment of the present invention. The security system 1335 includes a security manager 1405, security engines 1410, security policies 1415, and security data 1420.

In one embodiment, the security manager 1405 includes code for performing enumeration, namely, to identify the external device 1110 or external device 1110 type and to identify the corresponding ED driver 1245 capable of establishing communication between the security device 1210 and the external device 1110. The security manager 1405 also includes code to control execution of the various security engines 1410 based on the security policies 1415 and security data 1420 to evaluate data transfer requests or other device requests. Further, the security manager 1405 includes code to communicate with the host 1205, which will be the source of the data transfer and/or other requests.

In one embodiment, the security engines 1410 includes code for securing the transfer of data between the host 1205 and the external device 1110 based on the security policies 1415 and security data 1420. The security engines 1410 may include firewalls, antivirus, anti-spyware, malicious content filtering, multilayered security monitors, Java and bytecode monitors, etc. The security engines 1410 may also include data privacy modules to enforce data privacy policies 1415. Each security engine 1410 may have dedicated security policies 1415 and security data 1420 to indicate which procedures, URLs, system calls, content, ID, etc. the data requested for transfer may contain or whether the data requested for transfer is considered nontransferable (or nontransferable without additional security measure such as a password and ID).

To provide a higher security level, the security engines 1410 may implement content analysis and risk assessment algorithms. In one embodiment, a security engine 1410 assigns a weight and rank for every transfer object based on its type, complexity, richness in abilities, source, etc. The security engine 1410 may assign weight based on the source using a list of known dangerous or known safe sources. The security engine 1410 may assign weight to objects based on the category of the source, e.g., a gambling source, an adult content source, a news source, a reputable company source, a banking source, etc. The security engine 1410 may calculate the weight, and based on the result determine whether to allow or disallow access to the content, the script to run, the system modification to occur, etc. The security engine 1410 may "learn" user content (by analyzing for a predetermined period of time the general content that the user accesses) and accordingly may create personal content profiles. The personal content profile may be used to calibrate the weight assigned to content during runtime analysis to improve accuracy and tailor weighted risk analysis for specific user characteristics.

Thus, upon receiving a data transfer and/or other request from the host 1205, the security manager 1405 will launch the appropriate security engines 1410 based on the security policies 1415. For example, the security policies 1415 may be configured not to allow specific ActiveX controls to be loaded from the host 1205 onto the external device 1110. The security policies 1415 may be configured not to allow data transfer from private folders on the host 1205 to the external device 1110. The security manager 1405 will launch the appropriate security engines 1410 to assure that these example security policies 1415 are met. Further, the security engines 1410 may use security data 1420, which may include definition files of malicious ActiveX controls, locations of private folders, etc.

Although not shown, the security system 1335 may include additional components such as the preboot flash 520 with OS and applications, the remote management module 550, the distribution module 555, and the backup module 560 discussed above with reference to FIG. 5. Other components are also possible.

Figure 15:
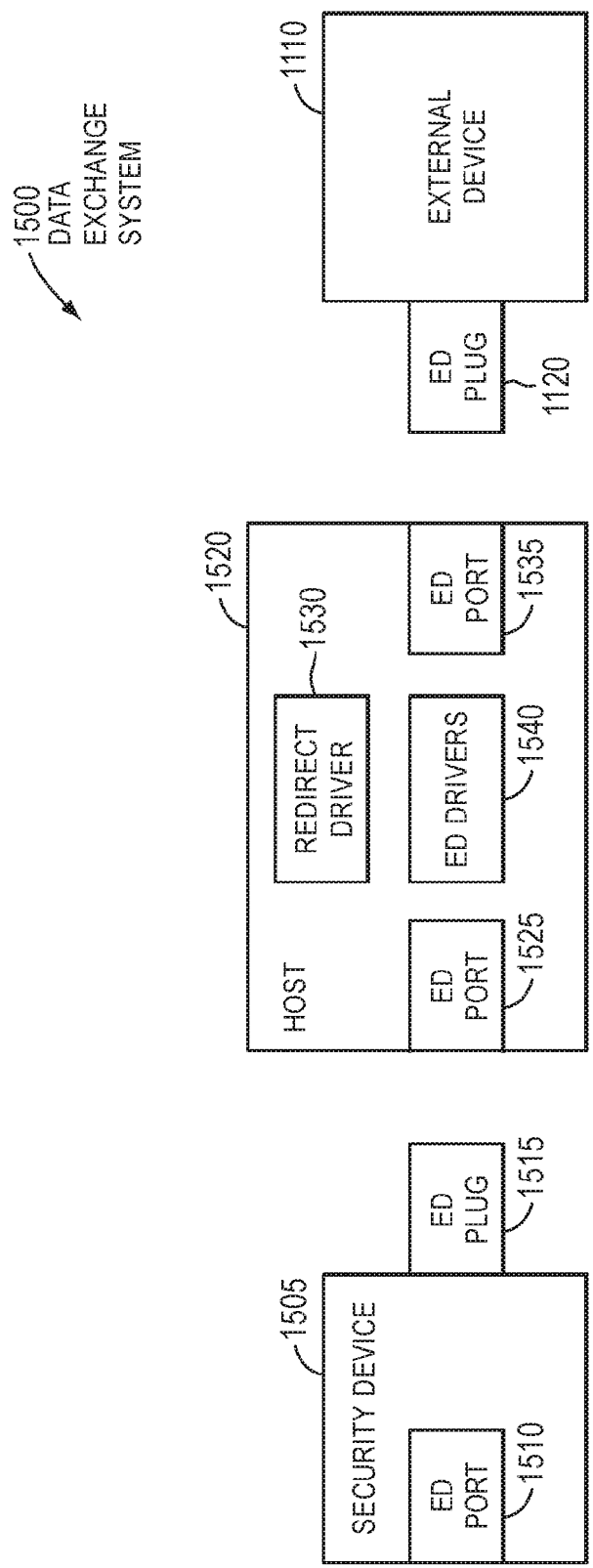
FIG. 15 is a block diagram illustrating a secure data exchange system, in accordance with another embodiment of the present invention.

FIG. 15 is a block diagram illustrating a secure data exchange system 1500, in accordance with another embodiment of the present invention. The secure data exchange system 1500 includes a security device 1505 communicatively coupled to the host 1520 via an ED plug 1515 on the security device 1505 and a first ED port 1525 on the host 1520. The secure data exchange system 1500 also includes an external device 1110 communicatively coupled to the host 1520 via the ED plug 1120 on the external device 1110 and a second ED port 1535 on the host 1520.

Because the external device 1110 is not directly coupled to the security device 1505, the security device 1505 is not physically intercepting the data transfer requests between the external device 1110 and the host 1520. Accordingly, in this embodiment, the host 1520 includes a redirect driver 1530, which is configured to redirect data transfer requests between the external device 1110 and the host 1520 regardless of data transfer direction. In one embodiment, the security device 1505 may be configured to protect only one of the external device 1110 or the host 1520. Further, in one embodiment, the security device 1505 does not contain any ED drivers, e.g., ED drivers 1245.

In one embodiment, if the security device 1505 is not coupled to the host 1520, the host 1520 uses the ED drivers 1540 to communicate with the external device 1110. In one embodiment, the host 1520 is configured not to communicate with the external device 1110 until the security device 1505 is coupled to the host 1520. In one embodiment, the host 1520 uses the ED drivers 1540 to communicate with the external device 1110 only if additional security measures are taken, such as receipt of a password and ID, or until the security device 1505 is coupled to the host 1520.

In one embodiment, the host 1520 may conduct enumeration of the security device 1505 upon connection of the security device 1505 to the ED port 1525. Upon identifying the security device 1505 or security device 1505 type, the host 1520 may initiate the redirect driver 1530 to redirect all data transfer requests or other external device 1110 requests from all other ED ports 1535 to the security device 1505. In one embodiment, the redirect driver 1530 only accepts data transfer requests from the security device 1505, which presents the requests of the external device 1110 as a proxy. In one embodiment, the redirect driver 1530 performs data transfer requests received from the external device 1110 only after the security device 1505 has conducted its check and given its authorization. Other protocols are also possible.

Figure 16:
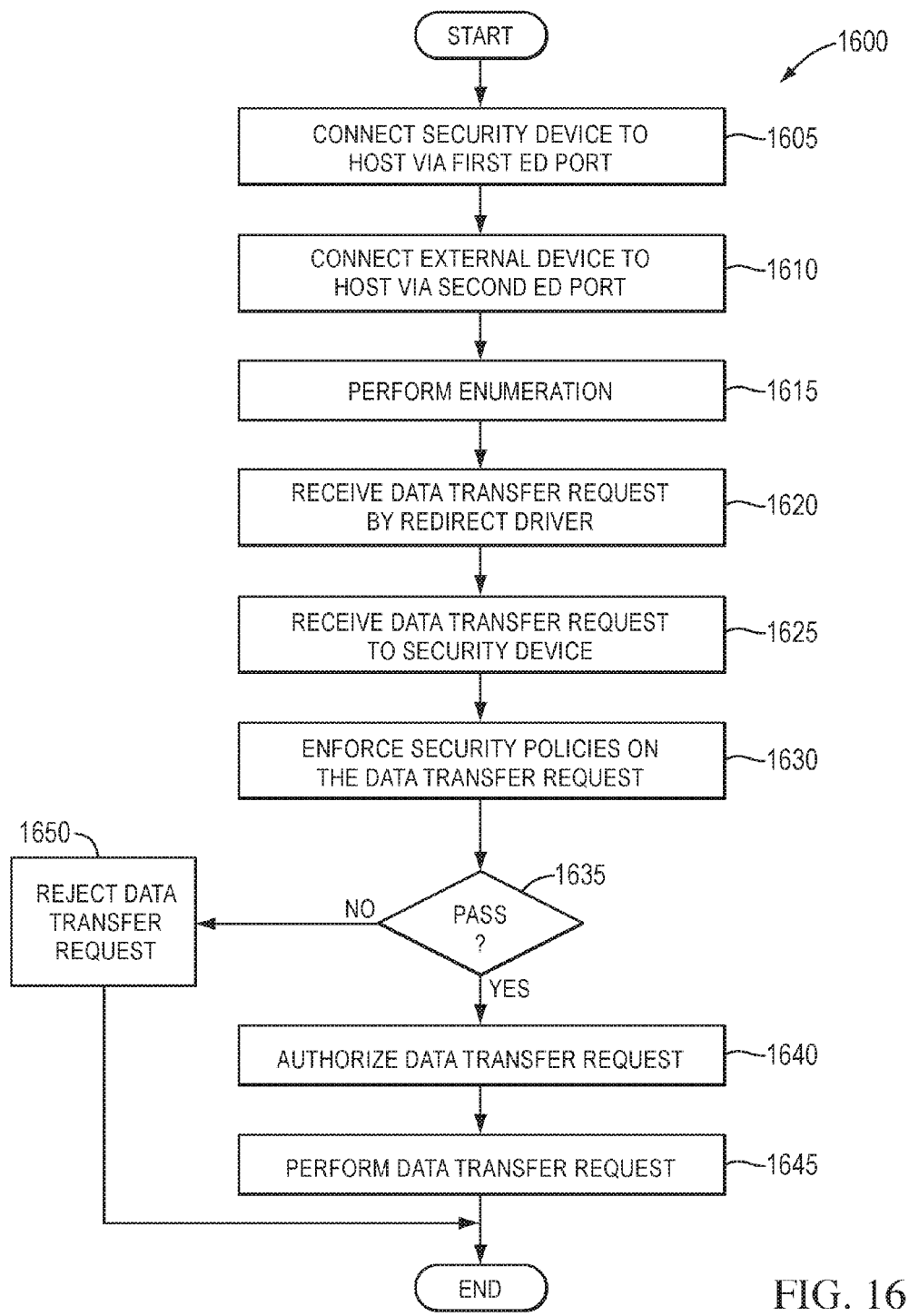
FIG. 16 is a flowchart illustrating a method of secure data exchange between a host and an external device, in accordance with an embodiment of the present invention.

FIG. 16 is a flowchart illustrating a method 1600 of secure data exchange between a host and an external device, in accordance with an embodiment of the present invention. The method 1600 begins in step 1605 with the security device 1505 being connected to the first ED port 1525 of the host 1520. The external device 1110 in step 1610 is connected to the second ED port 1535 of the host 1520. The host 1505 in step 1615 performs enumeration techniques to identify the security device 1505 and the external device 1110 and to install the appropriate drivers 1530/1540 to enable communication with the security device 1505 and the external device 1110. The redirect driver 1530 in step 1620 receives a data transfer request from either the host 1505 to the external device 1110 or from the external device 1110 to the host 1505. The redirect driver 1530 in step 1625 redirects the data transfer request to the security device 1505, which in step 1630 enforces its security policies (antivirus, anti-spyware, anti-adware, data privacy, etc.) on the data transfer request. The security device 1505 in step 1635 determines whether the data transfer request passes the security policies. If so, then the security device 1505 in step 1640 authorizes the data transfer request and the host 1520 in step 1645 performs the data transfer request. If not, then the security device 1505 in step 1650 rejects the data transfer request. Method 1600 then ends.

It will be appreciated that, in one embodiment, the security device 1210/1505 may be implemented as part of the host 1205/1520, e.g., within the housing of the host 1205/1520 and/or as a security procedure executed by the host 1205/1520.

Dynamic Isolation

Figure 17:
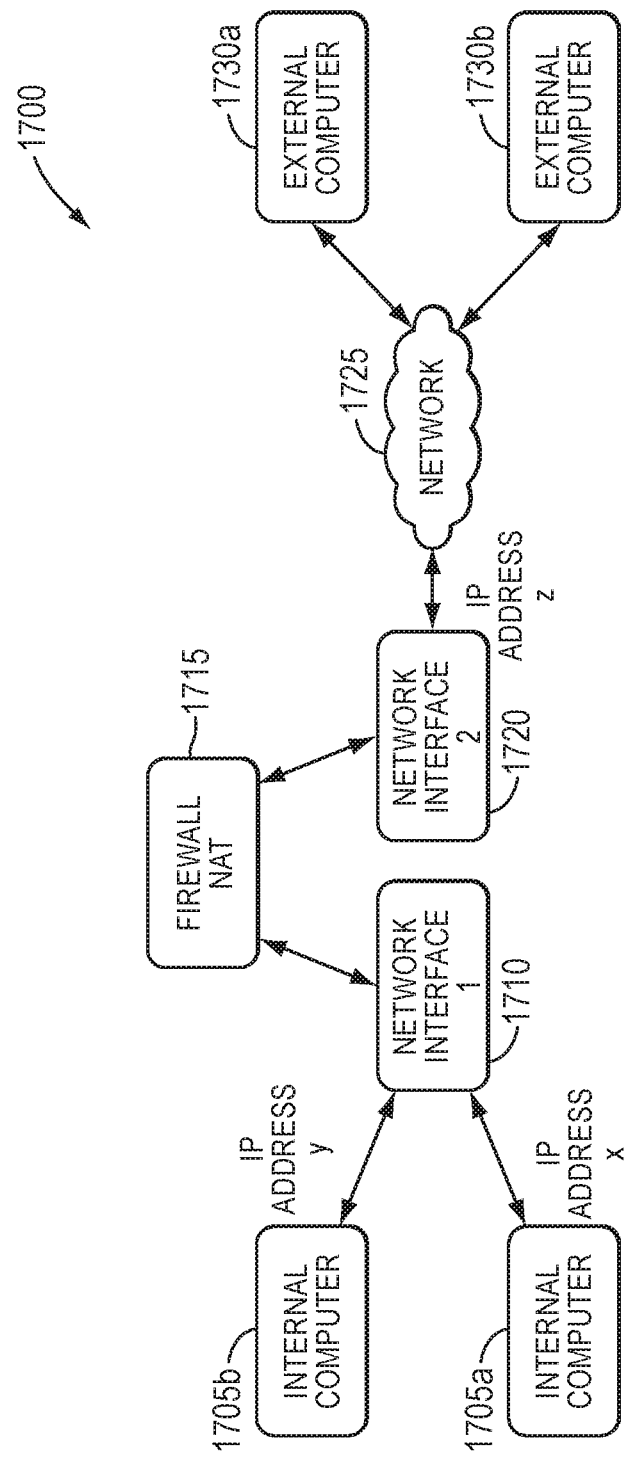
FIG. 17 is a block diagram illustrating a prior art network system having a hardware-based firewall.

FIG. 17 shows a prior art network system 1700 having a hardware-based firewall. The network system 1700 includes internal computers 1705a and 1705b, a first network interface card (NIC) 1710, a hardware-based firewall 1715 that performs network address translation (NAT), a second NIC 1720, an external network 1725 (such as the Internet), and external computers 1730a and 1730b.

The firewall 1715 is a hardware-based firewall, such as Check Point FW-1 aor Cisco PIX. The firewall uses two different network ports (the first NIC 1720 and the second NIC 1720) to separate and isolate the internal computers 1705a and 1705b from the external network 1720. The firewall 1715 uses network address translation (NAT) to translate the Internet Protocol (IP) address of the internal computer 1705a (denoted as IP address x) and the IP address of the internal computer 1705b (denoted as IP address y) into a public IP address z, thus hiding the IP addresses of the internal computers 1705a and 1705b. The firewall 1715 performs a similar translation on the Media Access Control (MAC) addresses of the internal computers 1705a and 1705b.

The network system 1700 provides a higher level of security than PC software-based firewalls (such as Microsoft Windows Personal Firewall and Check Point ZoneAlarm) running on the internal computers 1705a and 1705b themselves, since PC software-based firewalls do not hide the IP and MAC addresses of the internal computers.

Figure 18:
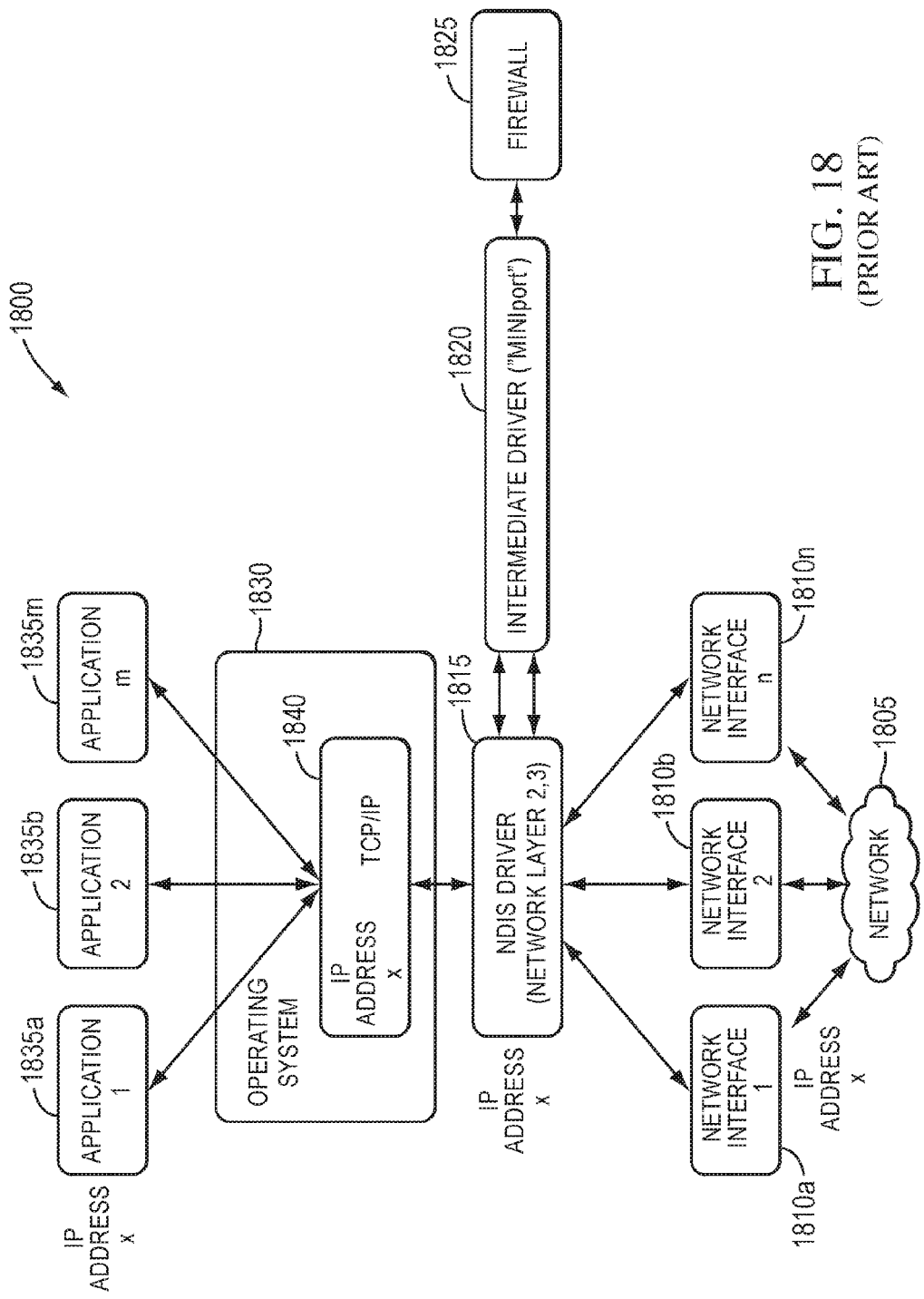
FIG. 18 is a block diagram illustrating a prior art network system having a software-based firewall.

FIG. 18 shows a prior art network system 1800 having a software-based firewall. The network system 1800 includes an external network 1805 (such as the Internet), one or more NICs 1810 (denoted as 1810a, 1810b, 1810n), a Network Driver Interface Specification (NDIS) driver 1815 that acts as an interface between layer 2 (the data link layer) and layer 3 (the network layer), an intermediate driver 1820 (such as MINIPort in the Microsoft Windows operating system), a software-based firewall 1825, an operating system 1830, and one or more applications 1835 (denoted as 1835a, 1835b, . . . 1835m). The operating system 1830 contains a TCP/IP protocol suite 1840.

In operation, the intermediate driver 1820 directs traffic arriving from the NICs 1810 and NDIS driver 1815 to the software-based firewall 1825. The software-based firewall 1825 decides what to do with the traffic (allow, deny, or reject) and permits only the allowed traffic to proceed to the operating system 1830.

The network system 1800 does not use a hardware-based firewall. Only one of the NICs 1810 needs to be used at any given time. However, the IP and MAC addresses of the NICs 1810 (which are visible to the external network 1805) are the same IP and MAC addresses that are viewed and used by the applications 1835 (i.e., there is no address isolation between the applications 1835 and the external network 1805).

Figure 19:
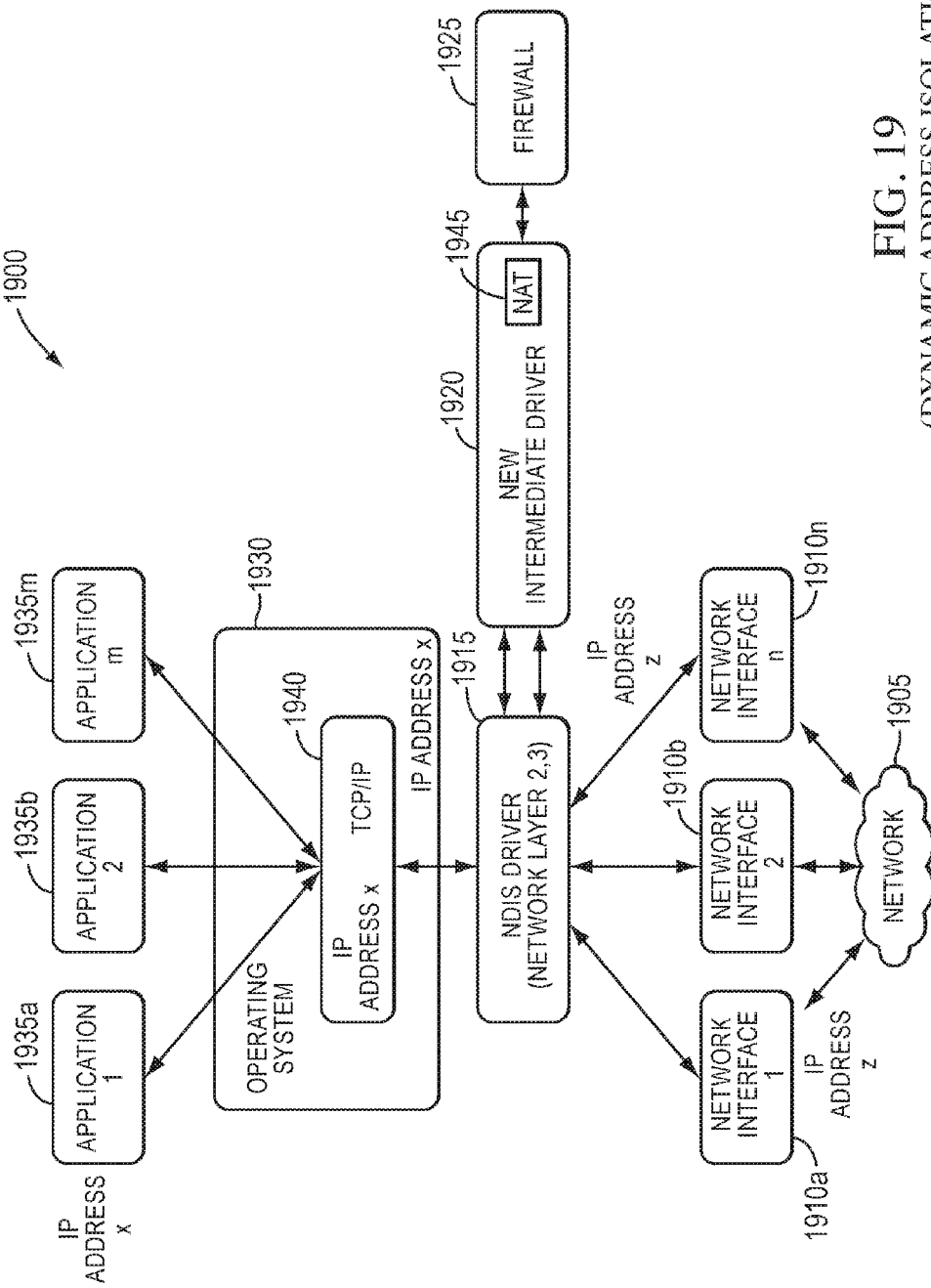
FIG. 19 is a block diagram illustrating a network system that performs dynamic address isolation, in accordance with an embodiment of the present invention.

FIG. 19 shows a network system 1900 that performs dynamic address isolation, in accordance with an embodiment of the present invention. The network system 1900 includes an external network 1905 (such as the Internet), one or more NICs 1910 (denoted as 1910a, 1910b, . . . 1910n), an NDIS driver 1915 that acts as an interface between layer 2 (the data link layer) and layer 3 (the network layer), an intermediate driver 1920, a software-based or hardware-based firewall 1925, an operating system 1930, and one or more applications 1935 (denoted as 1935a, 1935b, . . . 1935m). The operating system 1930 contains the TCP/IP protocol suite 1940. The intermediate driver 1920 includes a NAT engine 1945, which contains a translations table for IP and MAC addresses.

The NICs 1910, NDIS driver 1915, intermediate driver 1920, firewall 1925, operating system 1930, and applications 1935 may be installed in a mobile device 310. The firewall 1925 may be an external firewall 1925 connected to the intermediate driver 1920 by a Universal Serial Bus (USB) connection, a wireless connection, or another network wire connection. For example, the firewall 1925 may be part of the mobile security system 345.

In operation, the intermediate driver 1920 receives all data packets arriving from the NICs 1910 and NDIS driver 1915, and routes each data packet to the NAT engine 1945. The NAT engine 1945 uses Dynamic Host Configuration Protocol (DHCP) to dynamically isolate the IP addresses of the applications 1935 from the external network 1905. As shown in FIG. 19, the dynamic NAT engine 1945 translates the IP address of the application 1935 (IP address x) to a different IP address (IP address z) while interfacing with the NIC, and translates the IP address z back to the IP address x when sending data to the operating system 1930. Thus, the intermediate driver 1920 provides IP address z to the external network 1905, while isolating IP address x from the external network. The NAT engine 1945 performs a similar translation on MAC addresses, if necessary. As shown, the NAT engine 1945 is part of the intermediate driver 1920. However, one skilled in the art will recognize that the NAT engine 1945 may be located elsewhere, e.g., on the mobile security system 345, part of the firewall 1925, etc.

After the NAT engine 1945 translates the IP address, the intermediate driver 1920 directs each data packet to the firewall 1925. The firewall 1925 decides what to do with each data packet (allow, deny, or reject) and permits only the allowed data packets to proceed to the operating system 1930. The intermediate driver 1920 receives each allowed data packet back from the firewall 1925 and routes each allowed data packet to an application 1935.

For outgoing data packets, the intermediate driver 1920 receives each data packet from the application 1935 and routes each data packet to the NAT engine 1945. The NAT engine 1945 translates the IP and/or MAC address associated with the data packet as described above. The intermediate driver 1920 then receives each data packet (containing the translated IP and/or MAC address) back from the NAT engine 1945 and routes each data packet to the external network 1905.

In this way, the network system 1900 is able to isolate the IP and MAC addresses of internal computers/applications from the external network 1905, while not requiring the use of a hardware-based firewall or more than one NIC. Network isolation and separation is achieved even if the firewall lacks more than one NIC.

Thus, a connection between a mobile security system 345 and a mobile device 310 may be implemented while using the principles of NAT and DHCP, so that end-user applications running on the mobile device 310 will "see" protected virtual IP and MAC addresses, while devices connected to the external network see different physical IP and MAC addresses. The present invention provides similar protection and IP hiding that a hardware-based firewall having two network ports (internal and external) provides to a mobile device, but without the need to use a hardware-based firewall and two or more network ports.

Figure 23:
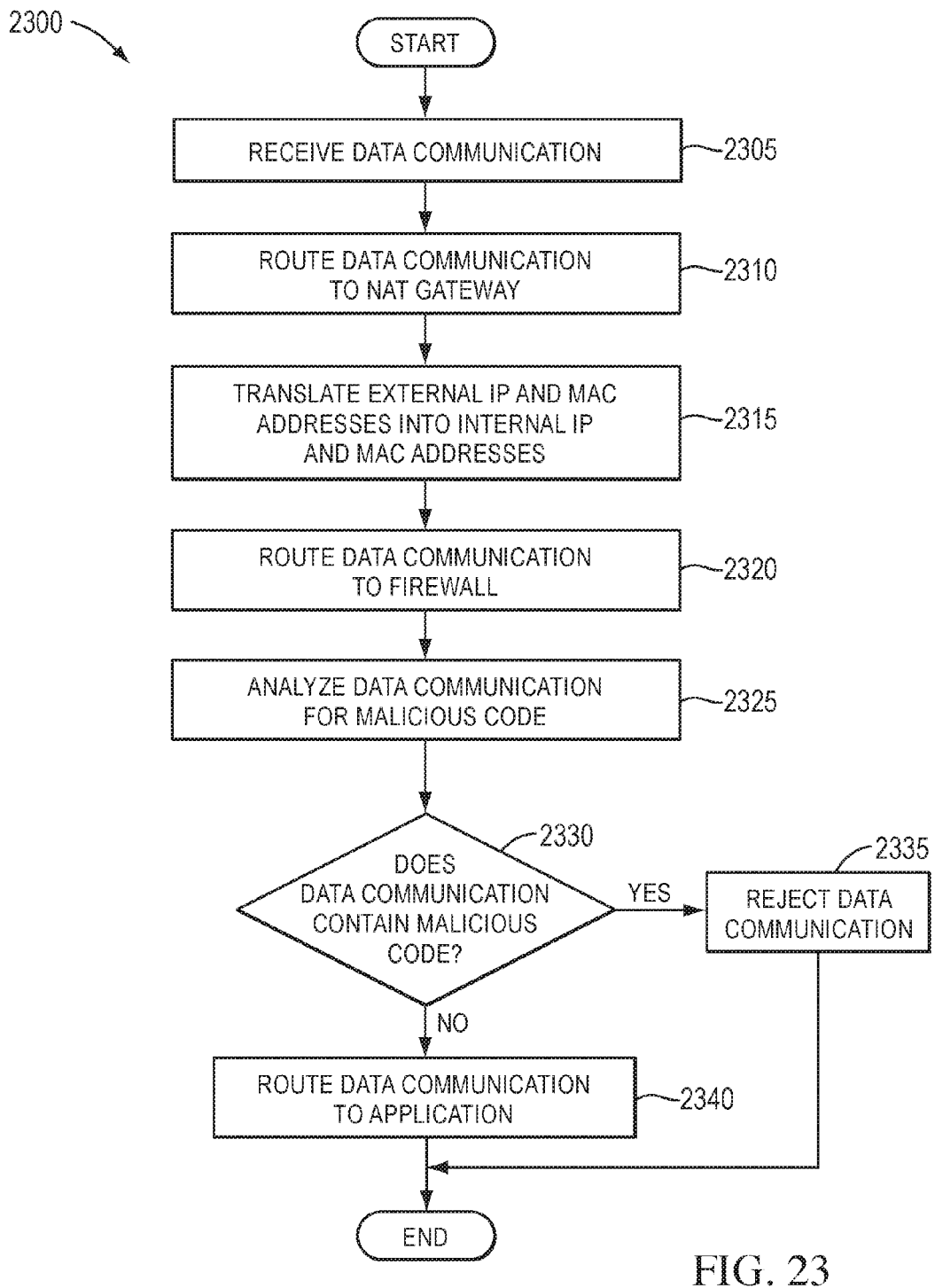
FIG. 23 is a flowchart of a method of routing a data communication from an external network to an application, in accordance with an embodiment of the present invention.

FIG. 23 is a flowchart of a method 2300 of routing a data communication from an external network (such as the external network 1905) to an application (such as application 1935), in accordance with an embodiment of the present invention. In step 2305, a NIC (such as NIC 1910) receives a data communication from the external network. Data specifying an external IP address and an external MAC address are embedded in the data communication. In step 2310, the data communication is routed to an intermediate driver (such as the intermediate driver 1920), which in turn routes the data communication to a NAT engine (such as the NAT engine 1945). The NAT engine contains a translations table for IP and MAC addresses.

In step 2315, the NAT engine uses DHCP to translate the external IP and MAC addresses embedded in the data communication into internal IP and MAC addresses. The NAT engine then substitutes the internal IP and MAC addresses for the external IP and MAC addresses in the data communication. In this way, the IP and MAC addresses of internal computers/applications are isolated from the external network.

In step 2320, the intermediate driver routes the data communication to a firewall (such as the firewall 1925). In step 2325, the firewall analyzes the data communication for malicious code. In step 2330, the firewall decides what to do with the data communication. If the data communication was found to contain malicious code, then the method 2300 proceeds to step 2335. In step 2335, the firewall rejects the data communication and prevents it from proceeding to the application. The method 2300 then ends.

If the data communication was not found to contain malicious code, then the method 2300 proceeds to step 2340. In step 2340, the firewall allows the data communication. The intermediate driver receives the data communication back from the firewall and routes the data communication to the application. The method 2300 then ends.

Figure 24:
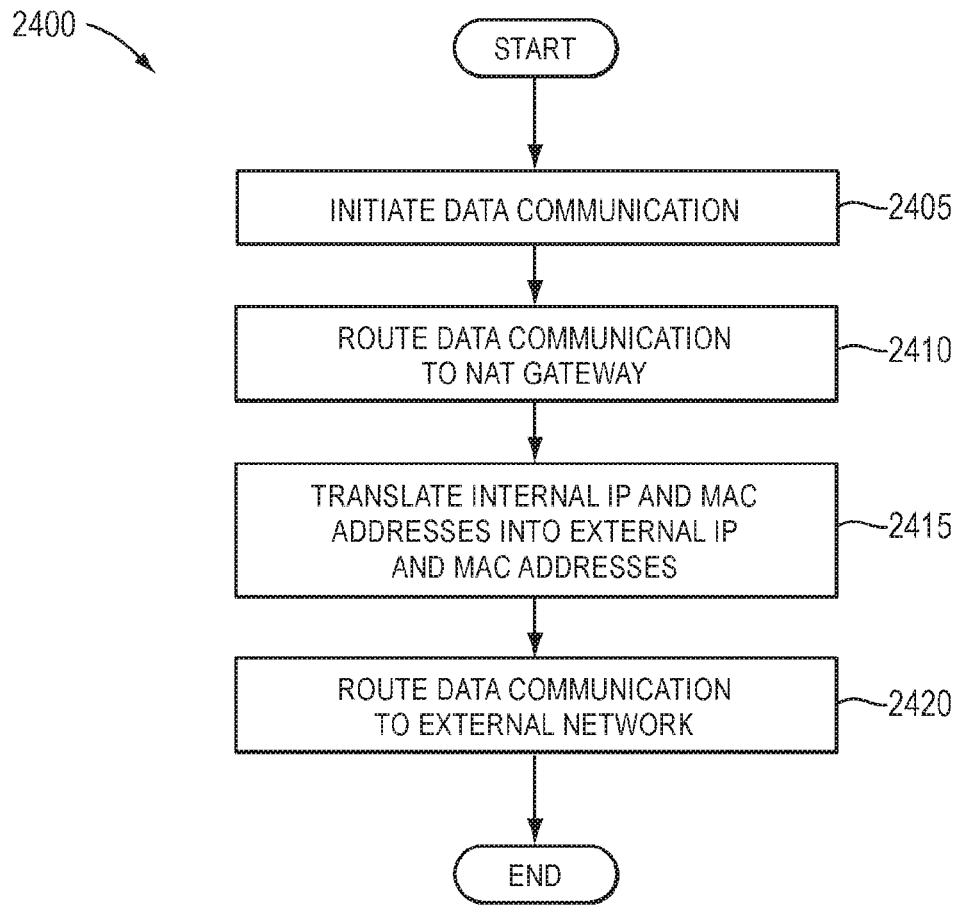
FIG. 24 is a flowchart of a method of routing a data communication from an application to an external network, in accordance with an embodiment of the present invention.

FIG. 24 is a flowchart of a method 2400 of routing a data communication from an application (such as application 1935) to an external network (such as the external network 1905), in accordance with an embodiment of the present invention. In step 2405, the application initiates a data communication. The application may embed data specifying an internal IP address and an internal MAC address in the data communication. In other embodiments, the internal IP address and the internal MAC address may be embedded by an operating system (such as the operating system 1930).

In step 2410, the data communication is routed to an intermediate driver (such as the intermediate driver 1920), which in turn routes the data communication to a NAT engine (such as the NAT engine 1945). The NAT engine contains a translations table for IP and MAC addresses. In step 2415, the NAT engine uses DHCP to translate the internal IP and MAC addresses embedded in the data communication into external IP and MAC addresses. The NAT engine then substitutes the external IP and MAC addresses for the internal IP and MAC addresses in the data communication. In this way, the IP and MAC addresses of internal computers/applications are isolated from the external network.

In step 2420, the internal driver routes the data communication to the external network via a NIC (such as NIC 1910). The method 2400 then ends.

Hybrid Firewall

Figure 20:
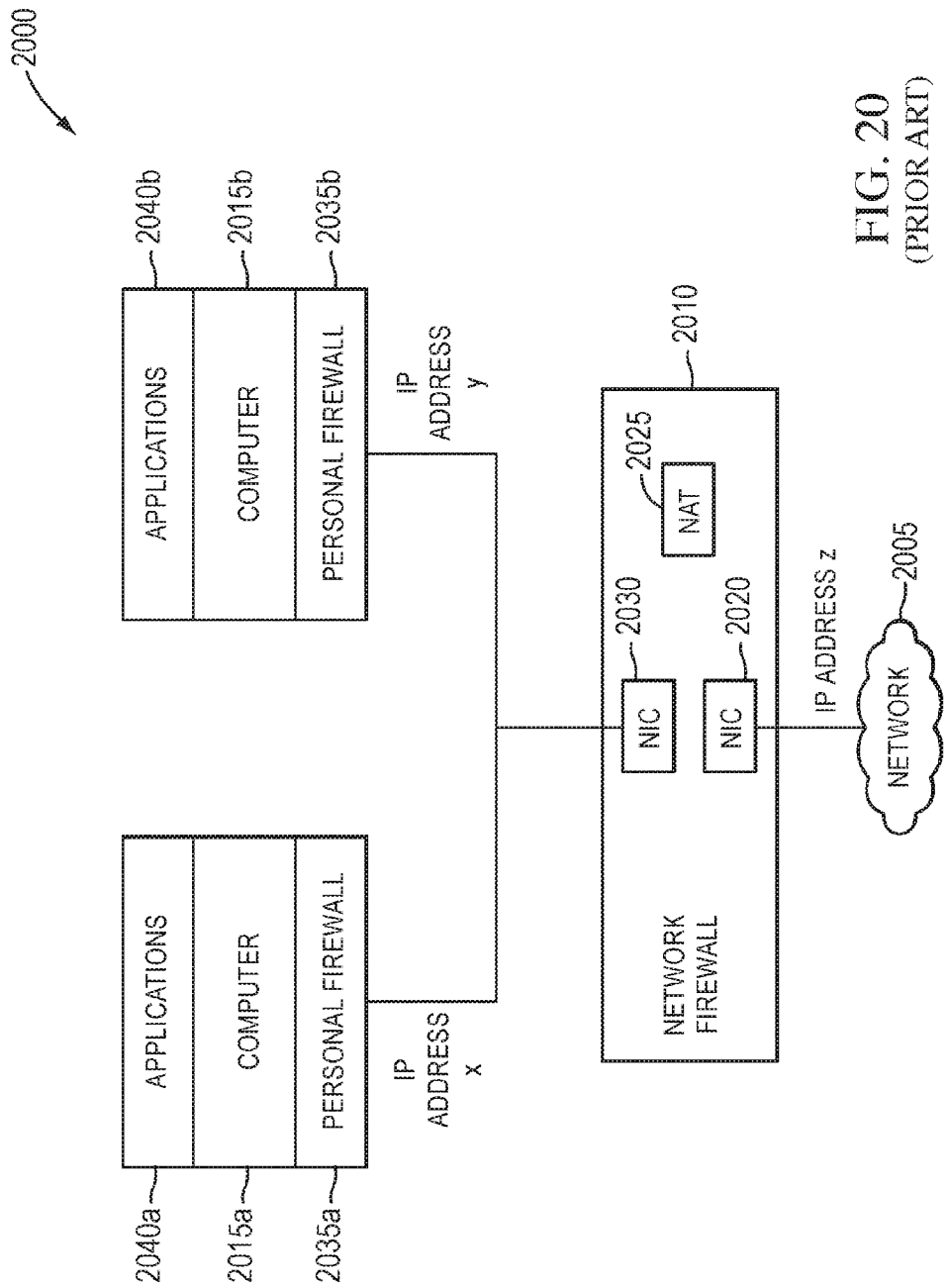
FIG. 20 is a block diagram illustrating a prior art network system having separate network and personal firewalls.

FIG. 20 shows a prior art network system 2000 having separate network and personal firewalls. The network system 2000 includes an external network 2005 (such as the Internet), a network firewall 2010, and personal computers 2015 (denoted as 2015a, 2015b, etc.). The network firewall 2010 may reside on an external device or computer. The network firewall 2010 comprises a first NIC 2020, a NAT gateway 2025 and a second NIC 2030. Each personal computer 2015 comprises a personal firewall 2035 (denoted as 2035a, 2035b, etc.) and an application 2040 (denoted as 2040a, 2040b, etc.).

In operation, the network firewall 2010 uses the NAT gateway 2025 to translate the IP address of the personal computer 2015a (denoted as IP address x) and the IP address of the personal computer 2015b (denoted as IP address y) into a public IP address z, and thus hide the IP addresses of the personal computers 2105. The network firewall 2010 performs a similar translation on the MAC addresses of the personal computers 2015. The network firewall 2010 also performs security measures such as antivirus, anti-spyware, anti-adware, etc. Because the network firewall 2010 is earlier in the network than the personal firewall 2035, it can stop malicious code before it enters the system 2000. However, because the network firewall 2010 is application insensitive and at a lower layer of the information stack, its processes for malicious code detection are limited.

The personal firewall 2035 also performs security measures such as antivirus, anti-spyware, anti-adware, etc. Because the personal firewall 2035 is application sensitive and at a higher layer of the information stack, its processes for malicious code detection can be more thorough and focused.

Figure 21:
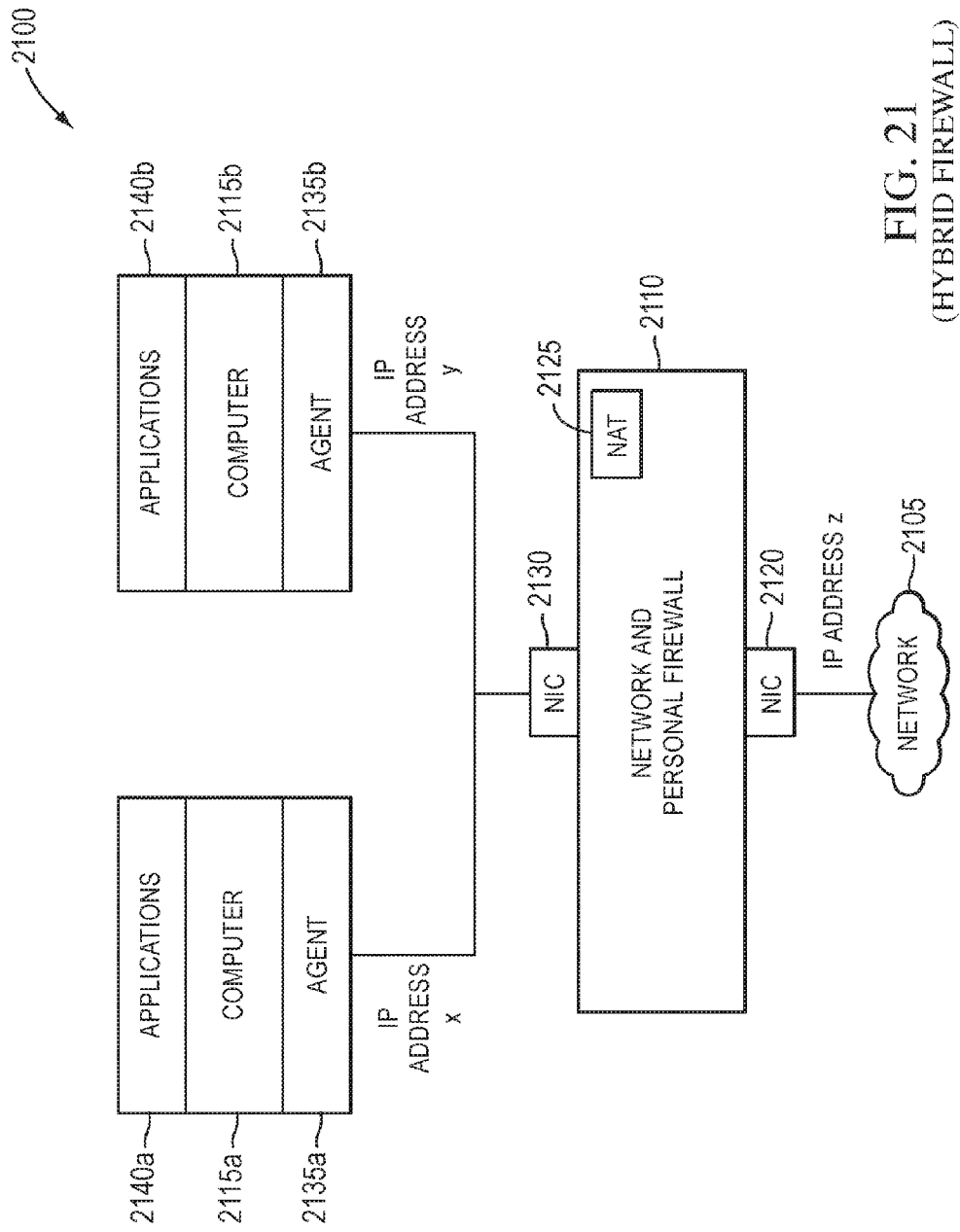
FIG. 21 is a block diagram of a network system comprising a hybrid firewall in accordance with an embodiment of the present invention.

FIG. 21 shows a network system 2100 comprising a hybrid firewall 2110 in accordance with an embodiment of the present invention. The network system 2100 includes an external network 2105 (such as the Internet), a hybrid network/personal firewall 2110, and personal computers 2115 (denoted as 2115a, 2115b, etc.).

The hybrid firewall 2110 may reside on an external device or computer. In other embodiments, the hybrid firewall 2110 may reside on the mobile security system 345, shown in FIGS. 10A-10C. The hybrid firewall 2110 comprises a first NIC 2120, a NAT engine 2125 and a second NIC 2130. Each personal computer 2115 comprises an agent 2135 (denoted as 2135a, 2135b, etc.) and one or more applications 2140 (denoted as 2140a, 2140b, etc.). As shown in FIG. 21, the network system 2100 comprises only two personal computers 2115, but in other embodiments the network system 2100 may comprise more than two personal computers.

In operation, the hybrid firewall 2110 uses the NAT engine 2125, which contains a translations table for IP and MAC addresses, to translate the IP address of the personal computer 2115a (denoted as IP address x) and the IP address of the personal computer 2115b (denoted as IP address y) into a public IP address z, and thus hide the IP addresses of the personal computers. The network firewall 2110 performs a similar translation on the MAC addresses of the personal computers 2115.

The hybrid firewall 210 is capable of performing both the network firewall and personal firewall security measures. Because the hybrid firewall 2010 is at the same level as the traditional network firewall 2035, it can stop malicious code before it enters the system 2100. Further, because the hybrid firewall 2110 is application sensitive, the hybrid firewall 2110 can perform the processes of the traditional personal firewall 2035.

To enable the hybrid firewall 2110 to be application sensitive, the agents 2135 send packets of data to the hybrid firewall 2110, each packet comprising data identifying the application 2140 associated with the packet. Because each packet comprises data identifying the application 2140 that is associated with the packet, the hybrid firewall 2110 can act as a personal firewall 2035 to handle application-level security. Then, the hybrid firewall 2110 can transmit a subset of the data packets, by extracting at least the application-identifying data, to the external network 2105.

Figure 22:
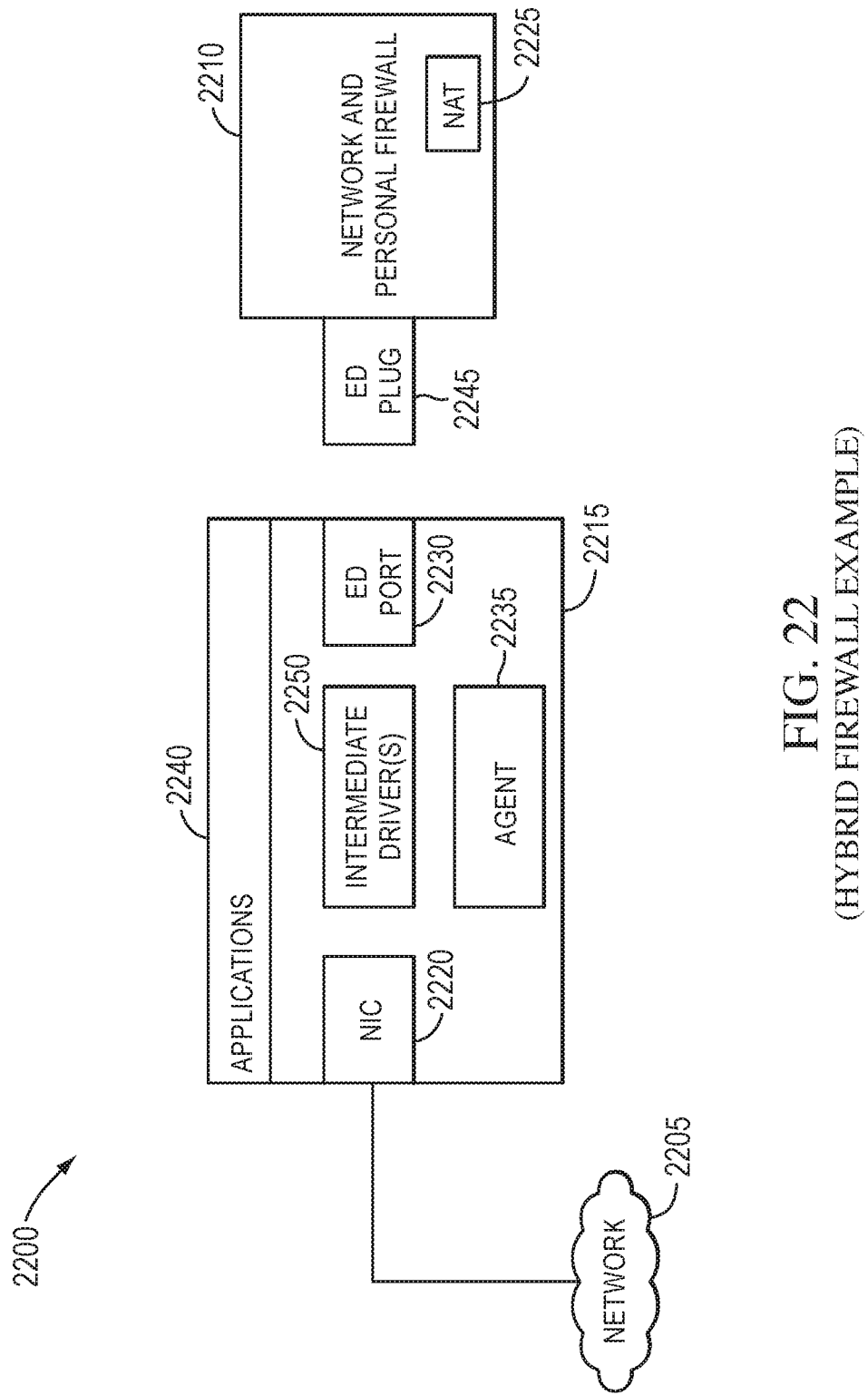
FIG. 22 is a block diagram illustrating a network system comprising a hybrid firewall and configured according to the embodiment of the present invention shown in FIG. 10A.

FIG. 22 shows a network system 2200 comprising a hybrid firewall 2210 and configured according to the embodiment of the present invention shown in FIG. 10A. The network system 2200 includes an external network 2205 (such as the Internet), a hybrid network/personal firewall 2210, and a mobile device 2215.

The hybrid firewall 2210 may reside on an external device in a pocket-size, handheld-size, keychain-size, or possibly smaller housing. The hybrid firewall 2210 comprises an ED plug 2245 (such as a USB plug) for communicating with an ED port 2230 (such as a USB port) contained within the mobile device 2215. The hybrid firewall 2210 also comprises a NAT engine 2225. In other embodiments, the hybrid firewall 2210 may be installed in the mobile device 2215, or connected to the mobile device 2215 by a wireless or another network wire connection.

The mobile device 2215 comprises a NIC 220, the ED port 2230, an agent 2235, one or more applications 2240, and an intermediate driver 2250 (such as MINIPort in the Microsoft Windows operating system). As shown in FIG. 22, the network system 2200 comprises only one mobile device 2215 and hybrid firewall 2210, but in other embodiments the network system 2200 may comprise more than one mobile device and hybrid firewall.

In operation, the intermediate driver 2250 directs traffic arriving from the NIC 2220 to the hybrid firewall 2210 via the ED port 2230 and ED plug 2245. The hybrid firewall 2210 decides what to do with the traffic (allow, deny, or reject) and permits only the allowed traffic to proceed to an application 2240.

The hybrid firewall 2210 uses the NAT engine 2225, which contains a translations table for IP and MAC addresses, to translate the IP address of the mobile device 2215 into a public IP address, and thus hide the IP address of the mobile device 2215. The hybrid firewall 2210 performs a similar translation on the MAC address of the mobile device 2215.

The application 2240 can send packets of data via the ED port 2230 and ED plug 2235 to the hybrid firewall 2210 for transmission to the external network 2205. The agent 2235 associates data identifying the application 2240 with the packets of data that are sent to the hybrid firewall 2210. Each packet thus comprises data identifying the application 2240 associated with the packet. Because each packet comprises data identifying the application 2240 associated with the packet, the hybrid firewall 2210 can act as a personal firewall to handle application security.

Figure 25:
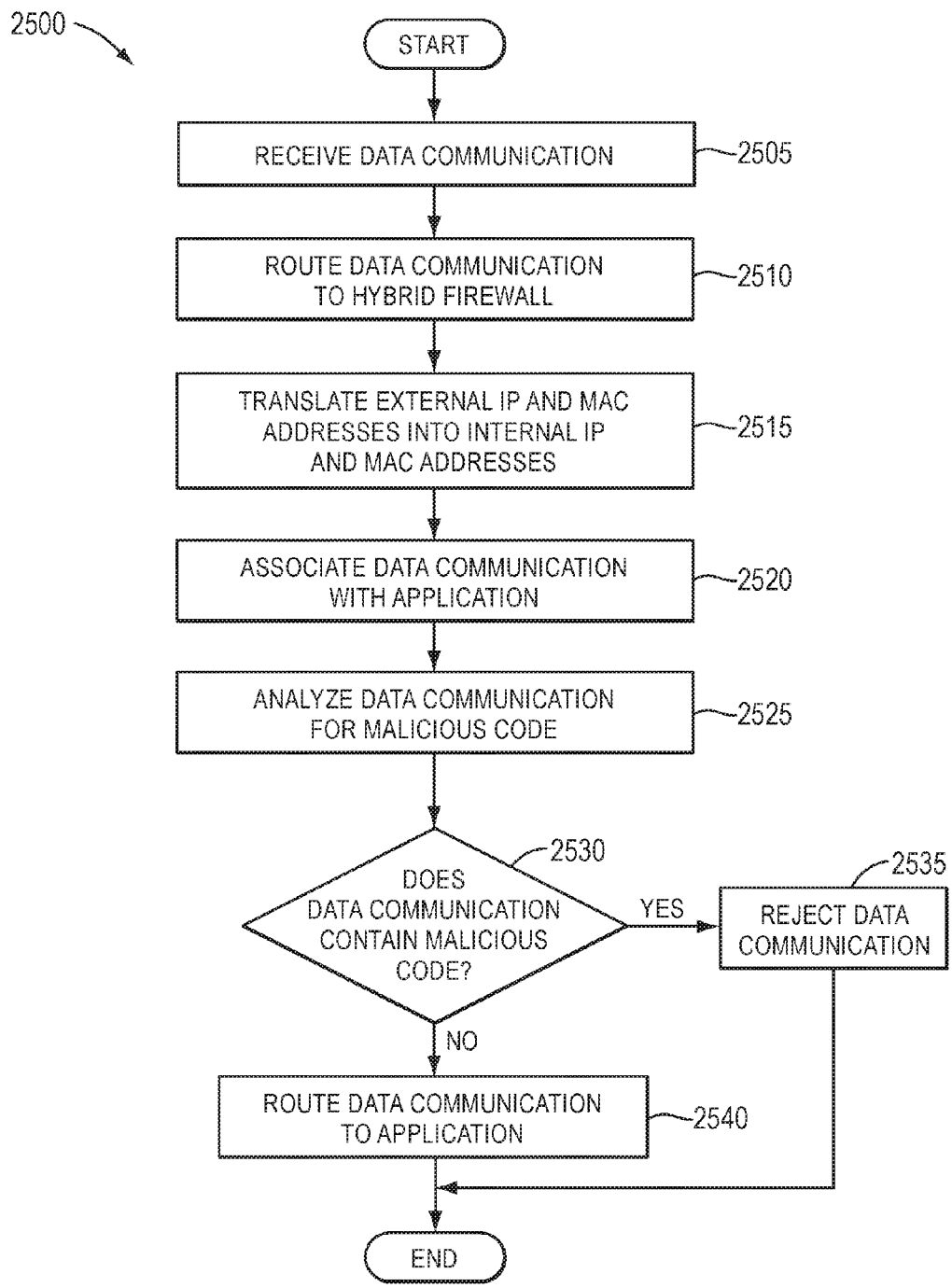
FIG. 25 is a flowchart of a method of routing a data communication from an external network to an application, in accordance with an embodiment of the present invention.

FIG. 25 is a flowchart of a method 2500 of routing a data communication from an external network (such as the external network 2105 or 2205) to an application (such as application 2140 or 2240), in accordance with an embodiment of the present invention. In step 2505, a NIC (such as NIC 2120 or 2220) receives a data communication from the external network. Data specifying an external IP address and an external MAC address are embedded in the data communication. In step 2510, the data communication is routed to a hybrid network/personal firewall (such as the firewall 2110 or 2210) that comprises a NAT engine (such as the NAT engine 2125 or 2225) containing a translations table for IP and MAC addresses. The hybrid firewall is at the same level as a traditional network firewall and is application sensitive.

In step 2515, the NAT engine uses DHCP to translate the external IP and MAC addresses embedded in the data communication into internal IP and MAC addresses. The NAT engine then substitutes the internal IP and MAC addresses for the external IP and MAC addresses in the data communication. In this way, the IP and MAC addresses of internal computers/applications are isolated from the external network.

In step 2520, the hybrid firewall associates the data communication with an application. The hybrid firewall makes this association based upon data packets previously received by the firewall that comprised application-identifying information.

In step 2525, the hybrid firewall analyzes the data communication for malicious code. Because the hybrid firewall is at the same level as a traditional network firewall, it can stop malicious code before it reaches a computer (such as computer 2115 or 2215). Further, because the hybrid firewall is application sensitive, the hybrid firewall can perform the function of a traditional personal firewall to handle application-level security.

In step 2530, the firewall decides what to do with the data communication. If the data communication was found to contain malicious code, then the method 2500 proceeds to step 2535. In step 2535, the firewall rejects the data communication and prevents it from proceeding to the application. The method 2500 then ends.

If the data communication was not found to contain malicious code, then the method 2500 proceeds to step 2540. In step 2540, the firewall allows the data communication, and the data communication is routed to the application. The method 2500 then ends.

Figure 26:
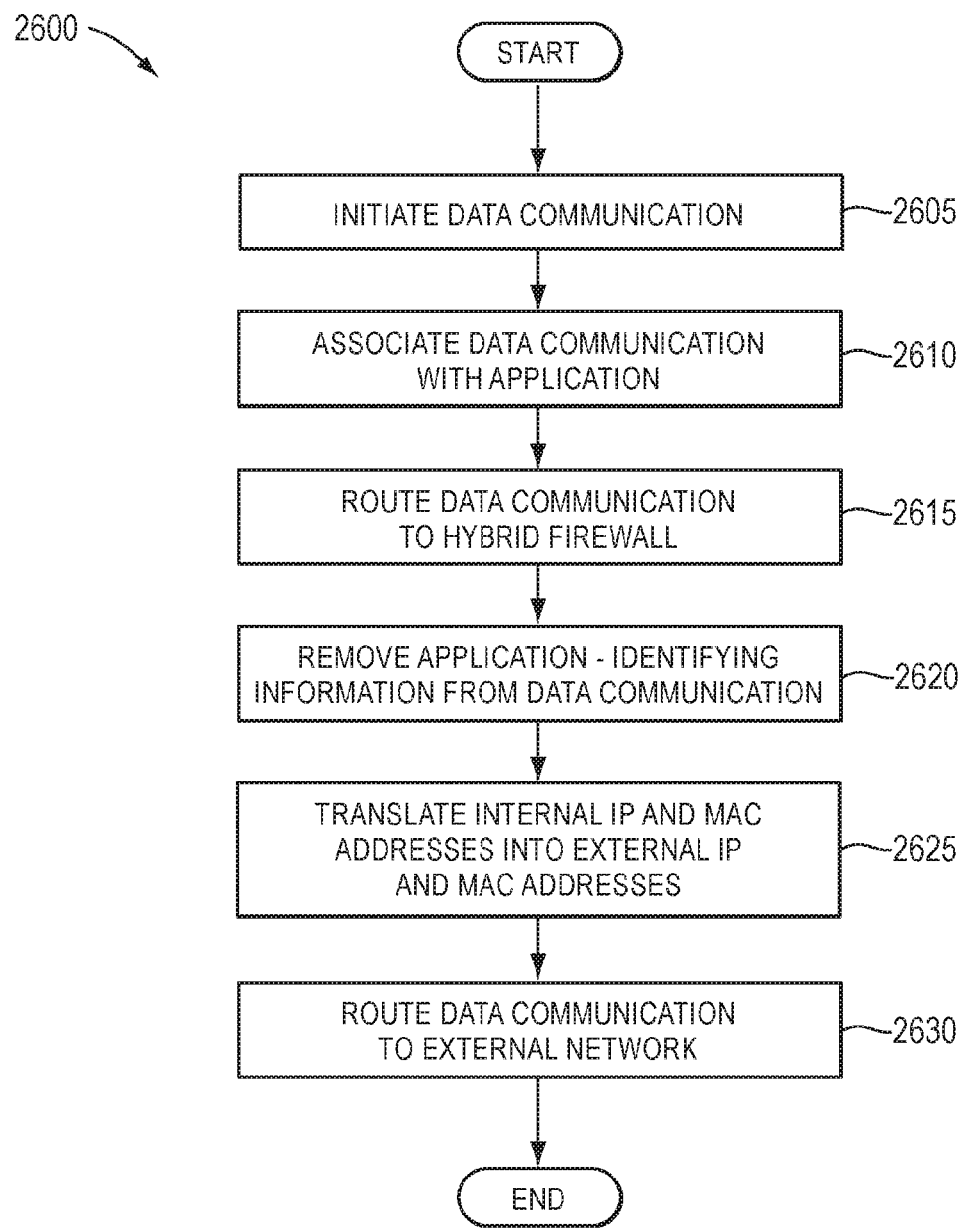
FIG. 26 is a flowchart of a method of routing a data communication from an application to an external network, in accordance with an embodiment of the present invention.

FIG. 26 is a flowchart of a method 2600 of routing a data communication from an application (such as application 2140 or 2240) to an external network (such as the external network 2105 or 2205), in accordance with an embodiment of the present invention. In step 2605, the application initiates a data communication. The application may embed data specifying an internal IP address and an internal MAC address in the data communication. In other embodiments, the internal IP address and the internal MAC address may be embedded by an operating system or by an agent (such as the agent 2135 or 2235) running on a computer.

In step 2610, data identifying the application is embedded in the data communication. This step may be performed by the application, by an operating system, or by an agent (such as the agent 2135 or 2235) running on a computer. In one embodiment, an agent running on the same computer as the application creates packets of data, each packet comprising data identifying the application associated with the packet. Because each packet comprises data identifying the application that is associated with the packet, a downstream hybrid firewall (such as the firewall 2110 or 2210) can act as a personal firewall to handle application-level security.

In step 2615, the data communication is routed to a hybrid network/personal firewall (such as the firewall 2110 or 2210) that comprises a NAT engine (such as the NAT engine 2125 or 2225) containing a translations table for IP and MAC addresses. The hybrid firewall is at the same level as a traditional network firewall and is application sensitive.

In step 2620, the hybrid firewall extracts and removes the application-identifying information from the data communication. In step 2625, the NAT engine uses DHCP to translate the internal IP and MAC addresses embedded in the data communication into external IP and MAC addresses. The NAT engine then substitutes the external IP and MAC addresses for the internal IP and MAC addresses in the data communication. In this way, the IP and MAC addresses of internal computers/applications are isolated from the external network.

In step 2630, the data communication (minus data identifying the application, internal IP address, and internal MAC address) is routed to the external network via a NIC (such as NIC 2120 or 2220). The method 2600 then ends.

The foregoing description of the preferred embodiments of the present invention is by way of example only, and other variations and modifications of the above-described embodiments and methods are possible in light of the foregoing teaching. Although the network sites are being described as separate and distinct sites, one skilled in the art will recognize that these sites may be a part of an integral site, may each include portions of multiple sites, or may include combinations of single and multiple sites. The various embodiments set forth herein may be implemented utilizing hardware, software, or any desired combination thereof. For that matter, any type of logic may be utilized which is capable of implementing the various functionality set forth herein. Components may be implemented using a programmed general purpose digital computer, using application specific integrated circuits, or using a network of interconnected conventional components and circuits. Connections may be wired, wireless, modem, etc. The embodiments described herein are not intended to be exhaustive or limiting. The present invention is limited only by the following claims.

The invention claimed is:

1. A security system comprising:
   a communication interface configured to transmit an outgoing data packet with an external outgoing header to an external network and to receive an incoming data packet with an external incoming header from the external network, the external outgoing header including a public internet protocol (IP) address as a source address of the outgoing data packet, the external incoming header including the public IP address as a destination address of the incoming data packet;
   an address translation engine configured to:
      receive the outgoing data packet with an internal outgoing header from an internal device, the internal outgoing header identifying an internal IP address of the internal device as the source address of the outgoing data packet;
      receive from the communication interface the incoming data packet with the external incoming header, the internal device including a particular application associated with the outgoing data packet and with the incoming data packet;
      translate the internal IP address of the outgoing data packet to the public IP address and assist in forming the external outgoing header based on the public IP address;
      translate the public IP address of the incoming data packet to the internal IP address and assist in forming an internal incoming header based on the internal IP address; and
      store association of the internal IP address and the public IP address to assist with address translation; and
   a hybrid firewall configured to:
      receive a particular application identifier associated with the particular application from the internal outgoing header of the outgoing data packet;
      select one of several application-level security evaluations based on the particular application identifier determined based on the incoming data packet;
      perform a network-level security evaluation and the one of the several application-level security evaluations on the incoming data packet; and
      allow the incoming data packet to pass to the particular application if the network-level security evaluation and the one of the several application-level security evaluations determine that there is no malicious code in the incoming data packet.

2. The security system of claim 1, wherein the communication interface includes a network interface card communicatively coupled to the external network.

3. The security system of claim 2, wherein the security system is on a computer system remote from the internal device.

4. The security system of claim 1, wherein the communication interface includes a data port coupled to the internal device, the internal device including a network interface coupled to the external network and a driver for transferring the incoming data packet and the outgoing data packet to the security system via the data port.

5. The security system of claim 4, wherein the security system is on a portable device coupled via the data port to the internal device.

6. The security system of claim 1, wherein the address translation engine is part of the hybrid firewall.

7. The security system of claim 1, wherein the hybrid firewall is configured to remove the particular application identifier from the outgoing data packet.

8. The security system of claim 1, wherein the address translation engine is further configured to dynamically isolate the internal IP address from the external network using Dynamic Host Configuration Protocol.

9. The security system of claim 1, wherein the address translation engine is further configured to dynamically isolate a media access control (MAC) address of the internal device from the external network.

10. A security method, comprising:
    receiving by a security system an outgoing data packet with an internal outgoing header from an internal device, the security system being different than the internal device, the internal outgoing header identifying an internal internet protocol (IP) address of the internal device as a source address of the outgoing data packet, the internal outgoing header including an application identifier associated with a particular application that caused generation of the outgoing data packet;
    translating the internal IP address of the outgoing data packet to a public IP address;
    removing the application identifier from the outgoing data packet;
    storing the internal IP address, the public IP address, and the application identifier;
    forming the external outgoing header based on the public IP address, the external outgoing header including the public IP address as the source address of the outgoing data packet;
    transmitting the outgoing data packet with the external outgoing header to an external network;
    receiving an incoming data packet with an external incoming header from the external network, the external incoming header including the public IP address as a destination address of the incoming data packet;
    translating the public IP address of the incoming data packet to the internal IP address;
    forming an internal incoming header based on the internal IP address;
    retrieving the application identifier;

selecting a particular application-level security evaluation from several application-level security evaluations based on the application identifier;

performing by the security system a network-level security evaluation and the particular application-level security evaluation on the incoming data packet; and allowing the incoming data packet to pass to the particular application if the network-level security evaluation and the particular application-level security evaluation determine that there is no malicious code in the incoming data packet.

11. The security method of claim 10, wherein the step of receiving the outgoing data packet by the security system includes receiving the outgoing data packet by a network interface card communicatively coupled to the external network.

12. The security method of claim 11, wherein the security system is on a computer system remote from the internal device.

13. The security method of claim 10, wherein
the step of receiving the outgoing data packet by the security system includes receiving the outgoing data packet via a data port coupled to the internal device,
the step of receiving the incoming data packet includes receiving the incoming data packet via the data port, and
the internal device includes a network interface coupled to the external network and includes a driver for transferring the incoming data packet and the outgoing data packet to the security system via the data port.

14. The security method of claim 13, wherein the security system is on a portable device coupled via the data port to the internal device.

15. The security method of claim 10, wherein the step of translating the internal IP address of the outgoing data packet to the public IP address and the step of translating the public IP address of the incoming data packet to the internal IP address are performed by a network address translator, and wherein the network address translator is part of a firewall.

16. The security method of claim 10, wherein the step of removing the application identifier from the outgoing data packet is performed by a firewall.

17. The security method of claim 10, wherein the step of translating the internal IP address of the outgoing data packet to the public IP address includes using Dynamic Host Configuration Protocol.

18. The security method of claim 10, further comprising the step of dynamically isolating a media access control (MAC) address of the internal device from the external network.

* * * * *